United States Patent
Schlegel et al.

(10) Patent No.: US 8,827,282 B2
(45) Date of Patent: Sep. 9, 2014

(54) STORAGE BAG SYSTEM FOR WAGONS

(75) Inventors: Thomas Schlegel, Wheaton, IL (US); Mark Johnson, Chicago, IL (US); Ross Bartels, Chicago, IL (US); Jeffrey Bricker, Chicago, IL (US); Joseph Agati, Wheaton, IL (US)

(73) Assignee: Radio Flyer Inc., Chicago, IL (US)

( * ) Notice: Subject to any disclaimer, the term of this patent is extended or adjusted under 35 U.S.C. 154(b) by 618 days.

(21) Appl. No.: 13/006,613

(22) Filed: Jan. 14, 2011

(65) Prior Publication Data

US 2011/0169238 A1    Jul. 14, 2011

Related U.S. Application Data

(60) Provisional application No. 61/295,024, filed on Jan. 14, 2010, provisional application No. 61/460,541, filed on Jan. 3, 2011.

(51) Int. Cl.
| | |
|---|---|
| B62B 3/00 | (2006.01) |
| B62B 9/00 | (2006.01) |
| A45C 7/00 | (2006.01) |
| B62B 3/10 | (2006.01) |

(52) U.S. Cl.
CPC ........... *A45C 7/0077* (2013.01); *B62B 2202/24* (2013.01); *B62B 3/00* (2013.01); *B62B 9/00* (2013.01); *B62B 3/106* (2013.01); *B62B 3/007* (2013.01)
USPC ....................................... 280/47.34; 224/401

(58) Field of Classification Search
None
See application file for complete search history.

(56) References Cited

U.S. PATENT DOCUMENTS

| | | | | |
|---|---|---|---|---|
| 4,177,909 | A | | 12/1979 | Haskell |
| 4,361,215 | A | | 11/1982 | Sawai |
| 4,735,426 | A | | 4/1988 | McConnell |
| 4,796,909 | A | | 1/1989 | Kirkendall |
| 4,907,728 | A | * | 3/1990 | Giblet ........................... 224/585 |
| 4,941,603 | A | | 7/1990 | Creamer et al. |
| 5,407,218 | A | * | 4/1995 | Jackson .......................... 280/30 |
| 5,653,458 | A | | 8/1997 | Chaparian |
| 5,743,447 | A | * | 4/1998 | McDermott .................. 224/153 |
| 5,826,771 | A | | 10/1998 | Peng |
| 5,857,695 | A | | 1/1999 | Crowell |

(Continued)

FOREIGN PATENT DOCUMENTS

| | | |
|---|---|---|
| CA | 2246082 | 9/1998 |
| CN | 1572617 | 2/2005 |
| GB | 830828 | 3/1960 |
| JP | 2007030622 | 2/2007 |

OTHER PUBLICATIONS

Partial European Search Report, Application No. EP 11 25 0042, mailed Nov. 14, 2013.

(Continued)

*Primary Examiner* — J. Allen Shriver, II
*Assistant Examiner* — Hilary L Johns
(74) *Attorney, Agent, or Firm* — McDermott Will & Emery LLP

(57) ABSTRACT

A storage bag system for a wagon includes a collapsible storage bag that is movable between an expanded configuration and a collapsed configuration. The storage bag system also includes a connector for attaching the collapsible storage bag to a sidewall of the wagon. As a result, the invention provides additional hauling and storage capacity for a wagon via a collapsible storage bag that may be moved to a collapsed configuration.

46 Claims, 28 Drawing Sheets

(56) References Cited

U.S. PATENT DOCUMENTS

| | | | |
|---|---|---|---|
| 5,873,504 A * | 2/1999 | Farmer | 224/576 |
| 5,967,345 A | 10/1999 | Subotin | |
| 6,053,382 A | 4/2000 | Wyant | |
| 6,068,402 A | 5/2000 | Freese et al. | |
| 6,161,738 A | 12/2000 | Norris | |
| D437,006 S | 1/2001 | Pardi | |
| 6,443,481 B1 | 9/2002 | Stravitz et al. | |
| 6,802,327 B2 * | 10/2004 | Koss | 135/88.08 |
| 7,487,977 B2 | 2/2009 | Johnson | |
| 2004/0256910 A1 * | 12/2004 | Chalin et al. | 301/124.1 |

OTHER PUBLICATIONS

Search Report issued by Chinese Patent Office for related Chinese Patent Application No. 20111009748.4, dated Apr. 26, 2014.

\* cited by examiner

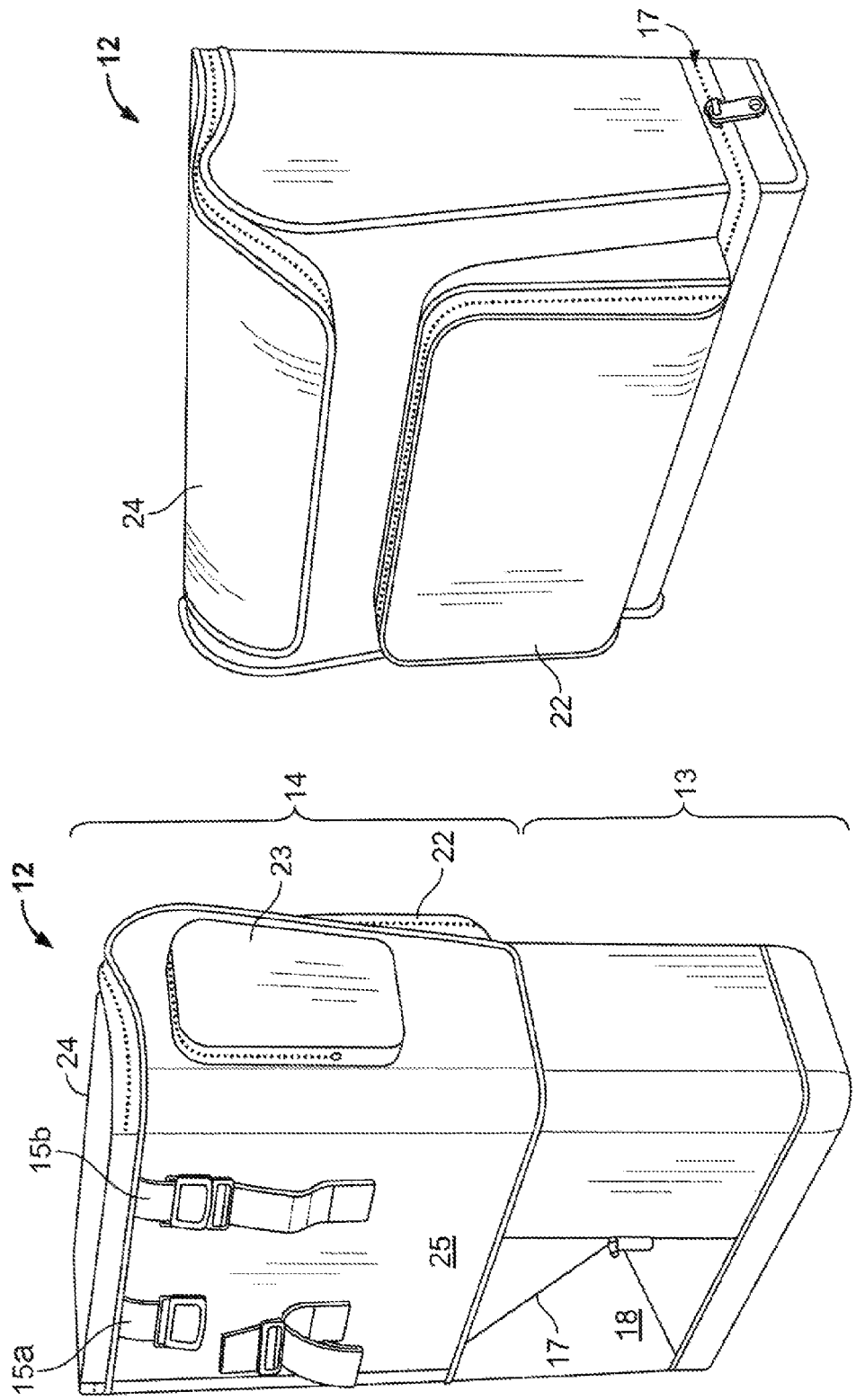

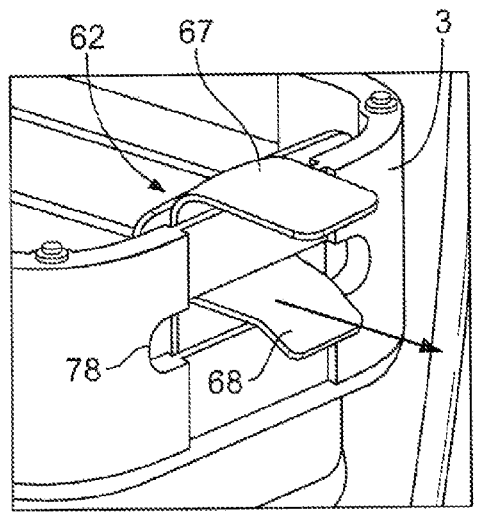
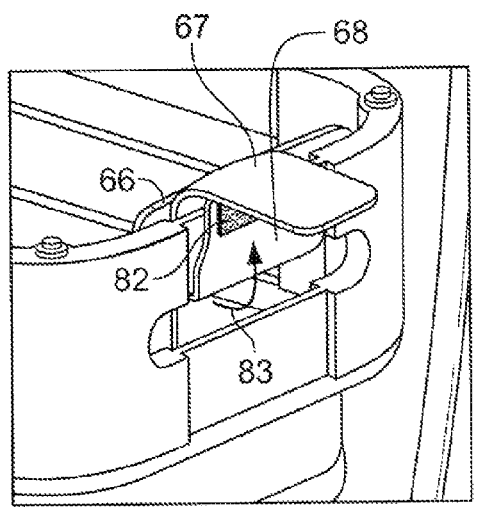
FIG. 12A  FIG. 12B
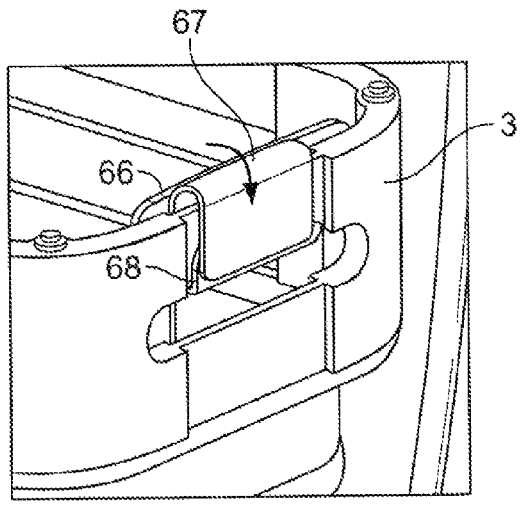
FIG. 12C

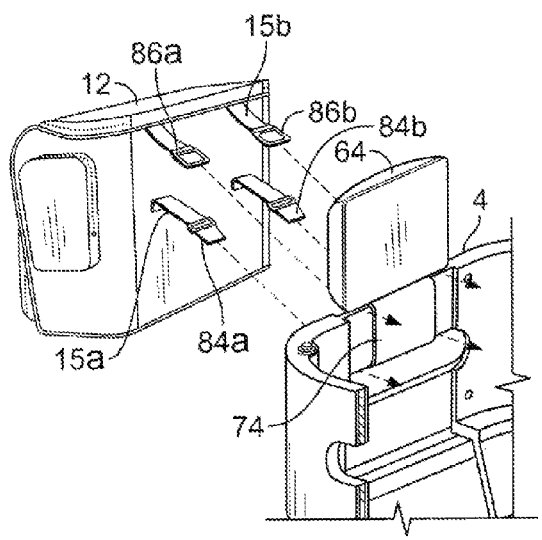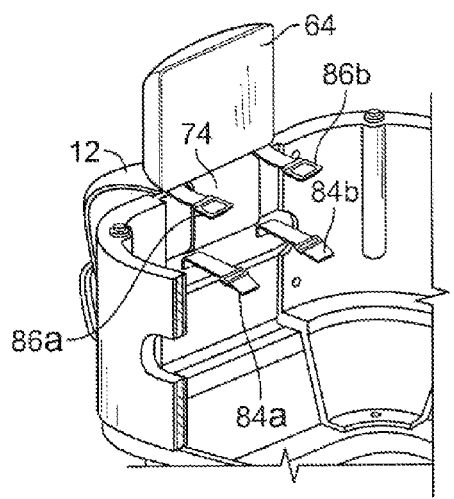
FIG. 14A  FIG. 14B
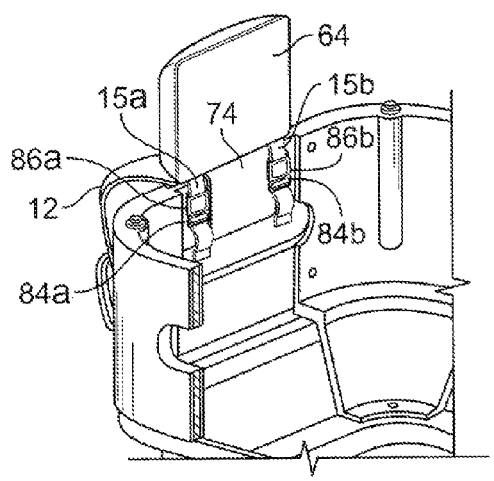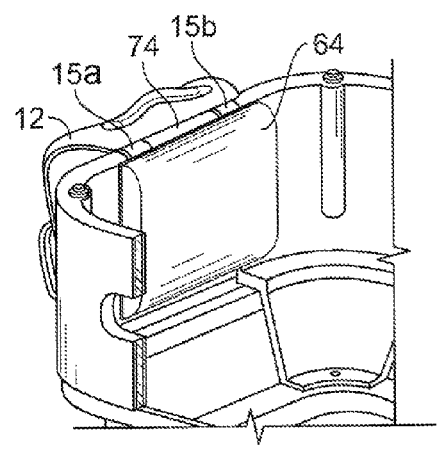
FIG. 14C  FIG. 14D

STORAGE BAG SYSTEM FOR WAGONS

CLAIM OF PRIORITY

This application claims priority from U.S. Provisional Patent Application Ser. No. 61/295,024, filed Jan. 14, 2010, and U.S. Provisional Patent Application Ser. No. 61/460,541, filed Jan. 3, 2011,

BACKGROUND

The present invention relates generally to vehicles for children and, more particularly, to storage bag systems for wagons.

Children's wagons have long been popular play items. They often feature a body constructed of steel, plastic, or wood that includes a floor surrounded by sidewalls so that cargo may be hauled. Alternatively, a child may sit or kneel on the floor of the wagon. Sidewalls generally maintain articles or children placed inside of the walls. Occasionally, the wagon employs a seat pad to create a more comfortable experience for a child sitting or kneeling on the floor of the wagon.

In addition, the wagon may feature folding seat panels which, when open, provide access to foot wells so that one or more children may actually sit in the wagon. An example of such a wagon is illustrated in commonly assigned U.S. Pat. No. 7,487,977 to Johnson.

The hauling capacity of prior art wagons, however, is often limited to the area enclosed by the sidewalls. As a result, a need exists for storage devices that may be attached to wagons to provide additional hauling capacity and storage.

BRIEF DESCRIPTION OF THE DRAWINGS

FIG. 3 is a front perspective view of the collapsible storage bag of FIG. 2 after removal from the rear sidewall of the wagon;

FIG. 4 is a rear perspective view of the collapsible storage bag of FIGS. 2 and 3 in a collapsed configuration;

FIGS. 12A-12C are perspective views of the front sidewall of the wagon of FIGS. 10 and 11 showing further steps of the installation of the front seat pad of FIGS. 10 and 11 thereto;

FIGS. 14A-14D are perspective views of the rear sidewall of the wagon of FIG. 13 illustrating installation of collapsible storage bag of FIGS. 2-6 and 13;

DESCRIPTION OF EMBODIMENTS

While embodiments of the storage bag system of the present invention are described below in terms of the illustrated wagons, it is to be understood that the storage bag system of the invention may be used with other types of wagons as well as with other vehicles in general.

Figure 1:
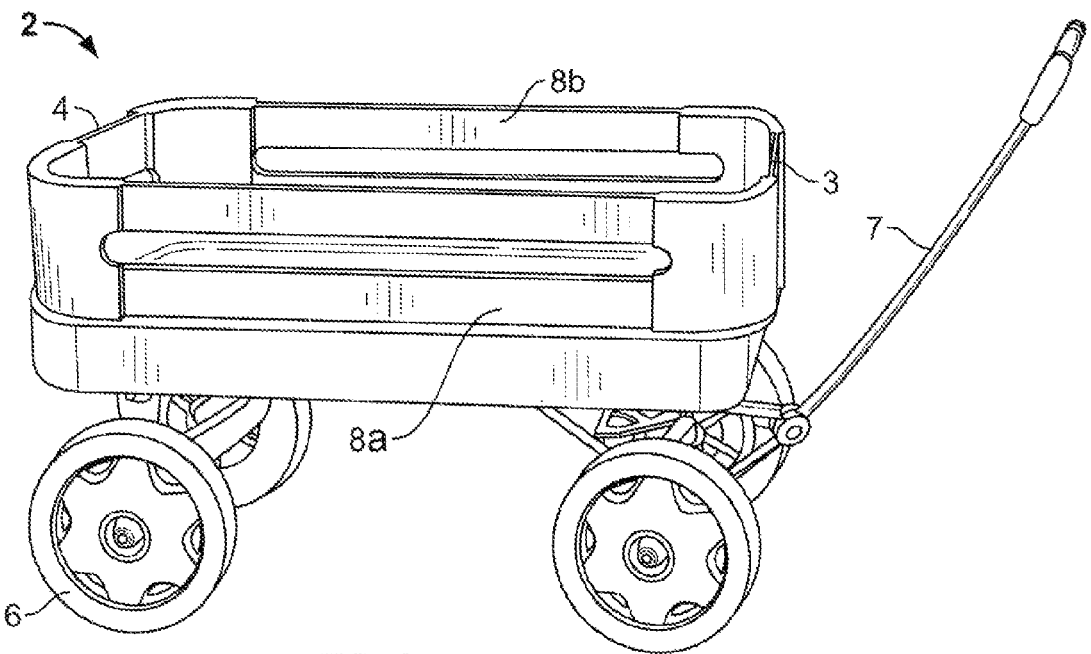
FIG. 1 is a perspective view of a prior art wagon suitable for use with a first embodiment of the storage bag system of the invention.

An example of a prior art wagon suitable for use with a first embodiment of the storage bag system of the invention is indicated in general at 2 in FIG. 1. As can be seen, the wagon includes a pair of side sidewalls 8a and 8b, a first or front sidewall 3, a second or rear sidewall 4, a body 5, four wheels 6 attached to the bottom of the body, and a handle 7 that is typically attached to either the front of the wagon body or to a pivoting bolster to which the front wheels of the wagon are attached. The wagon may alternatively include a single sidewall or any number of sidewalls or portions of sidewalls.

Figure 2:
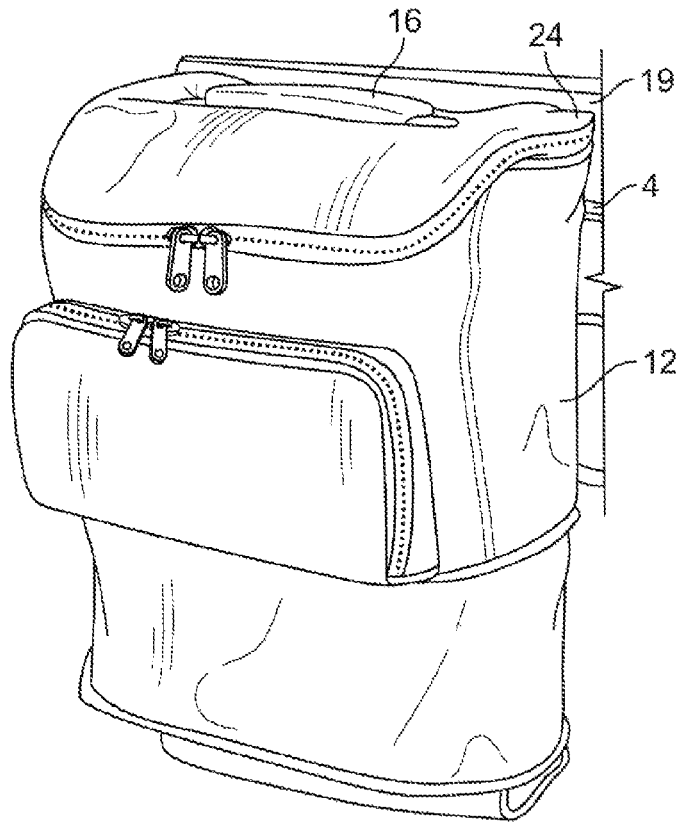
FIG. 2 is a rear perspective view of a collapsible storage bag of a first embodiment of the storage bag system of the invention attached to the rear sidewall of the wagon of FIG. 1 with the collapsible storage bag in an expanded configuration.
Figure 6:
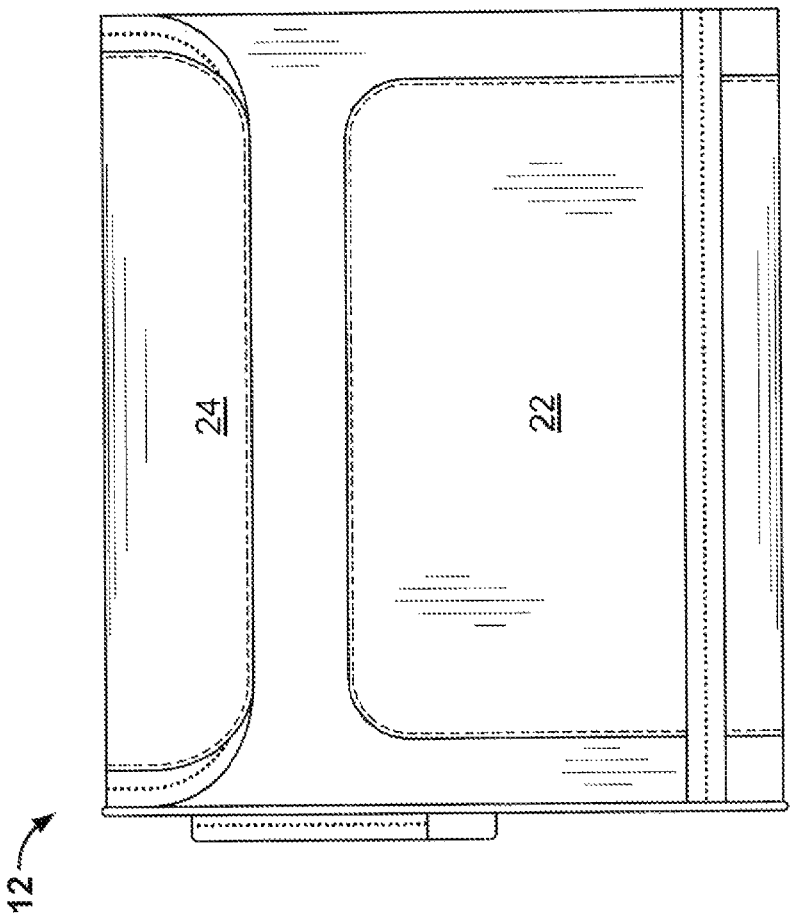
FIG. 6 is a rear elevation view of the collapsible storage bag of FIGS. 4 and 5.
Figure 5:
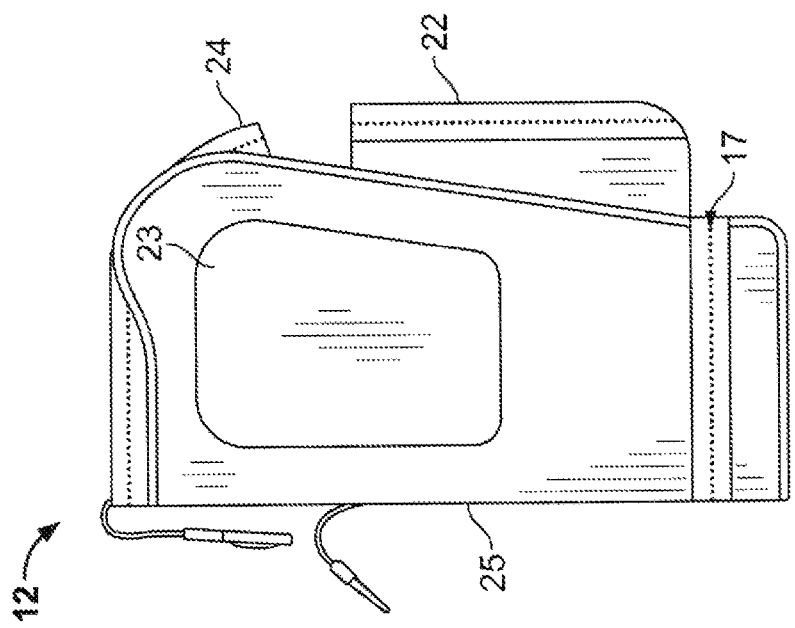
FIG. 5 is a side elevation view of the collapsible storage bag of FIG. 4.

A collapsible storage bag 12 of a first embodiment of the storage bag system of the invention is attached to the wagon of FIG. 1 as shown in FIG. 2. The collapsible storage bag 12 is disposed against the outside of the rear sidewall 4 and, as will be explained in greater detail below, engages the rear sidewall. The surface material of the collapsible storage bag preferably includes polyester, nylon, tricot, or fleece but alternatively may be leather, wool cloth, burlap, or any other suitable alternative or any combination of the foregoing.

As illustrated in FIG. 3, the collapsible storage bag, indicated in general at 12, includes a lower portion 13 that can be extended to place the bag in an expanded configuration, shown in FIGS. 2 and 3, or retracted into a collapsed configuration, shown in FIG. 4. As illustrated in FIG. 3, the collapsible storage bag also includes an upper portion 14 with strap connectors 15a and 15b preferably positioned on the back of the upper portion, near the top of the upper portion. Alternatively the connectors, which are discussed in greater detail below, may be placed in other suitable locations on the collapsible storage bag. The connectors are preferably sewn to the collapsible storage bag, but alternatively may be glued, bonded with adhesive, or attached in any other suitable manner. Further, the collapsible storage bag preferably includes a handle, such as the strap handle 16 of FIG. 2.

As illustrated in FIGS. 3-6, the lower portion 13 of the collapsible storage bag 12 contains a closure element that allows the lower portion of the collapsible storage bag to extend and contract. As illustrated in FIGS. 3-6, the closure element is preferably a zipper and more preferably a spiral zipper 17 that wraps around the lower portion. In its closed condition, the spiral zipper maintains the collapsible storage bag in the collapsed configuration (FIG. 4), which encloses an internal lining 18 (FIG. 3) entirely within the collapsible storage bag. A user converts the collapsible storage bag into its expanded configuration by pulling the spiral zipper around the lower portion of the collapsible storage bag, thereby disengaging the spiral zipper and placing it in the open condition and causing the lower portion of the collapsible storage bag to drip and expand to its expanded configuration, illustrated in FIG. 3. As the lower portion of the collapsible storage bag opens, the internal lining emerges to form part of the outer surface of the lower portion. A user converts the collapsible storage bag back to its collapsed configuration, illustrated in FIGS. 4-6, by pulling the spiral zipper in the opposite direction around the lower portion of the collapsible storage bag, thereby re-engaging the spiral zipper and causing the lower portion of the collapsible storage bag to raise and retract into its collapsed position and conceal the internal lining. As illustrated in FIGS. 3-6, the collapsible storage bag preferably contains a front pocket 22, side pocket 23, and lid 24. The lid, lower portion and pockets of the bag are preferably enclosed with a zippers, but alternatively a VELCRO closure element, clamps, hooks, magnets, clips, buttons, snaps, ties, or any other suitable enclosing closure element may be used.

The collapsible storage bag 12 preferably contains insulation that is 5 mm closed cell foam, but can alternatively be any suitable insulating or packing material sufficient to keep articles within the collapsible storage bag either cold or warm. The collapsible storage bag also preferably includes a board that maintains the rigidity of the collapsible storage bag. The board is preferably 1 mm polyethylene (PE) board, but alternatively may be any suitable rigid or semi-rigid material, and is preferably located inside of the collapsible storage bag to form a rigid back panel, indicated at 25 in FIGS. 3 and 5.

Figure 7:
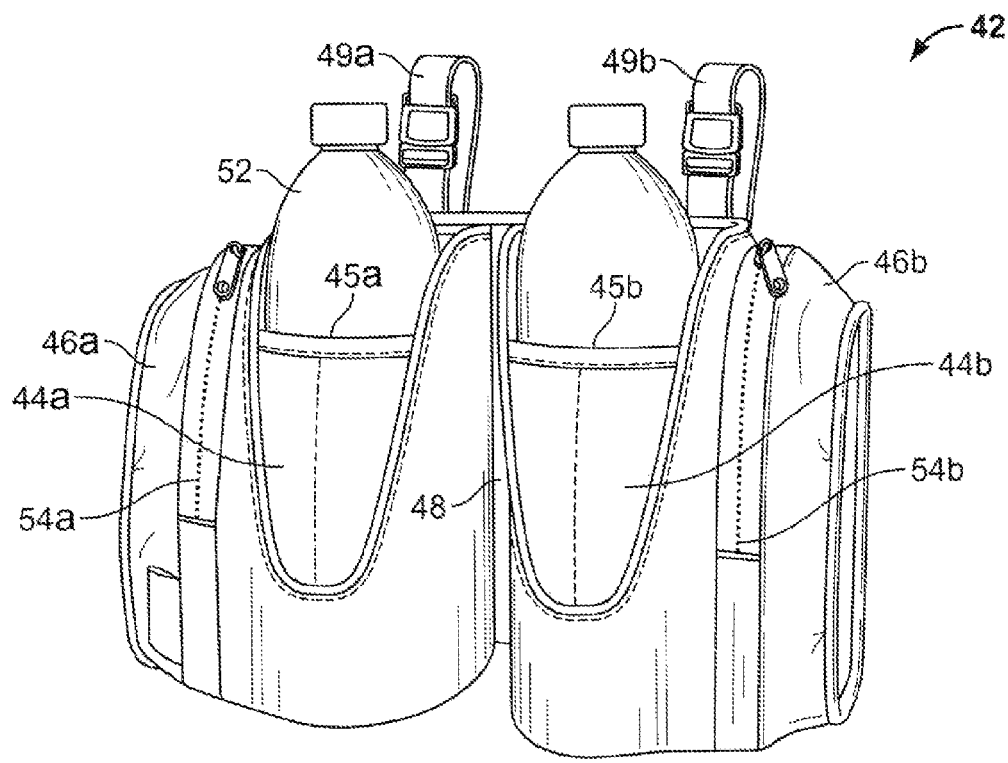
FIG. 7 is a front perspective view of an accessory bag suitable for installation on the front wall of the wagon of FIG. 1.
Figure 8:
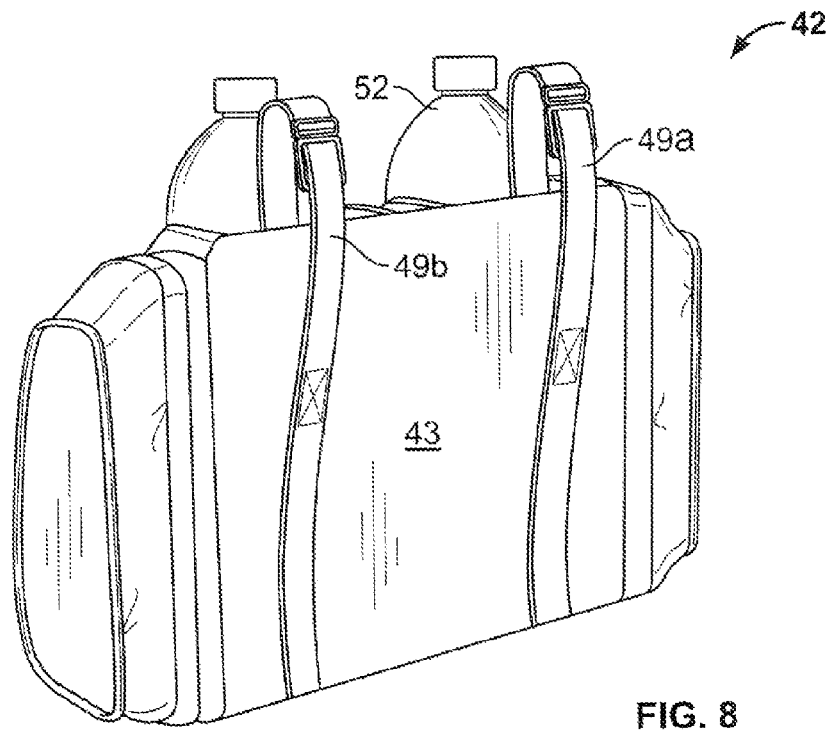
FIG. 8 is a rear perspective view of the accessory bag of FIG. 7.
Figure 9:
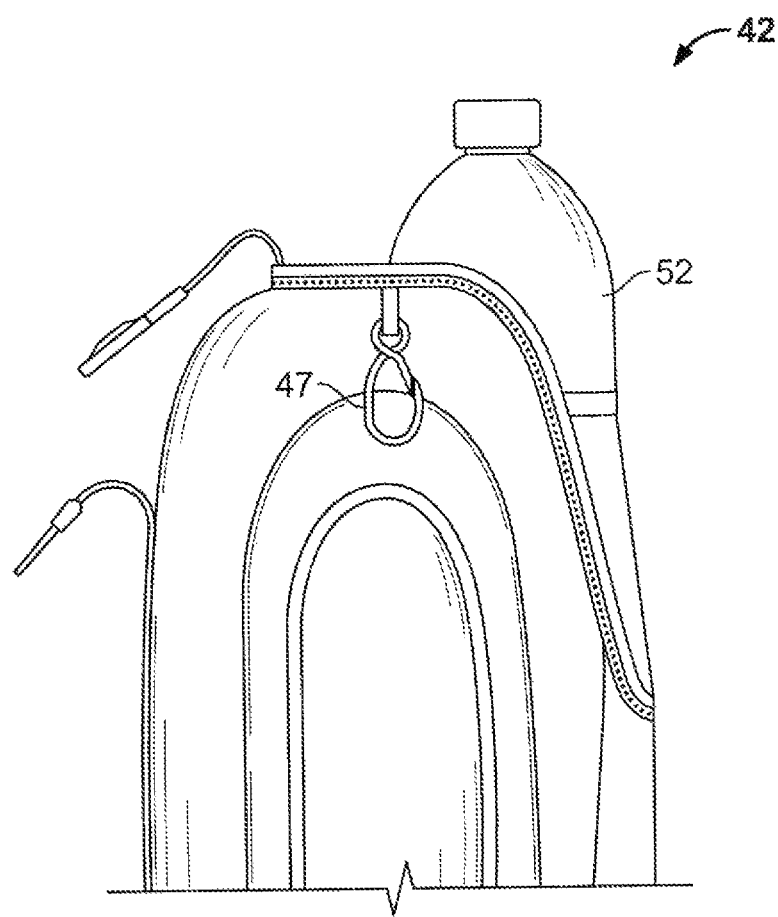
FIG. 9 is a partial side elevational view of the accessory bag of FIG. 7.

An accessory bag adapted for attachment to the front sidewall of the wagon (3 in FIG. 1) is indicated in general at 42 in FIGS. 7-9. As illustrated in FIG. 7, the accessory bag includes strap connectors 49a and 49b, preferably positioned on the generally flat, back panel 43 of the accessory bag, near the top of the accessory bag. Alternatively, the connectors may be placed in other suitable locations on the accessory bag. The connectors are preferably sewn to the accessory bag, but alternatively may be glued, bonded with adhesive, or attached in any other suitable manner. The surface material of the accessory bag 42 is preferably includes polyester, nylon, tricot, or fleece, but alternatively may be leather, wool cloth, burlap, or any other suitable fabric or material. The accessory bag also preferably includes a board that is preferably made from polyethylene to maintain the rigidity of the supplemental accessory bag and is preferably located inside of the supplemental accessory bag to form the semi-rigid back panel 43 (FIG. 8).

As illustrated in FIGS. 7-9, the accessory bag preferably contains a pair of bottle holders 44a and 44b featuring elastic portions 45a and 45b, respectively. The accessory bag also includes side pockets 46a and 46b and a key clip 47 (FIG. 9). The accessory bag therefore holds one or more water bottles 52, along with a small number of personal items such as keys or a wallet. The bottle holders 44a and 44b preferably include a mesh fabric. The side pockets 46a and 46b are preferably enclosed with zippers 54a and 54b, respectively, but alternatively use a VELCRO connection, clamps, hooks, magnets, clips, buttons, snaps, ties, or any other suitable enclosing device. Preferably, the accessory bag features a central channel 48 (FIG. 7) to allow the handle 7 (FIG. 1) of the wagon to rest in between, or against, a portion of the accessory bag when in a raised position.

Figure 10:
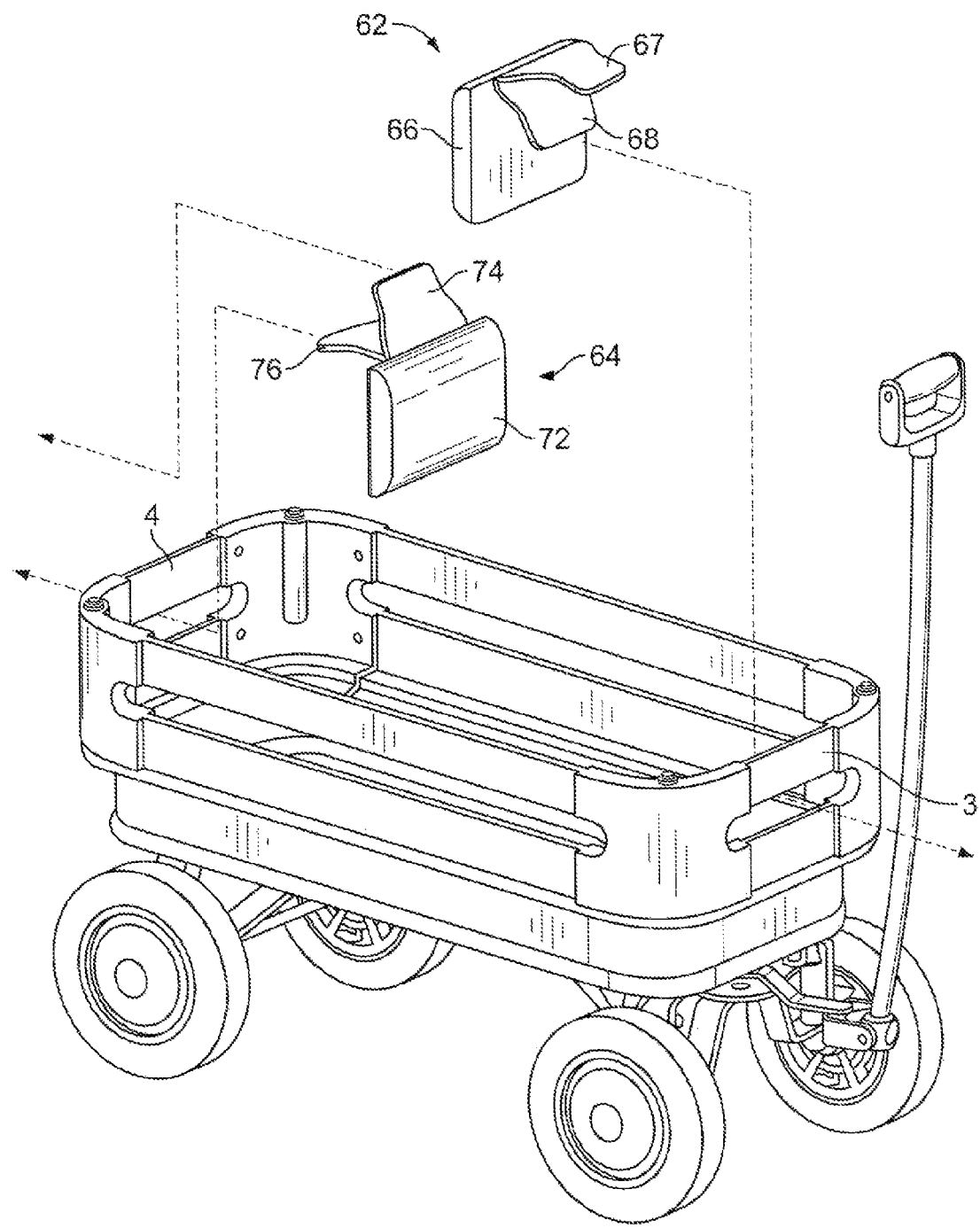
FIG. 10 is a perspective exploded view showing front and rear seat pads and the wagon of FIG. 1 prior to installation of the seat pads.
Figure 11:
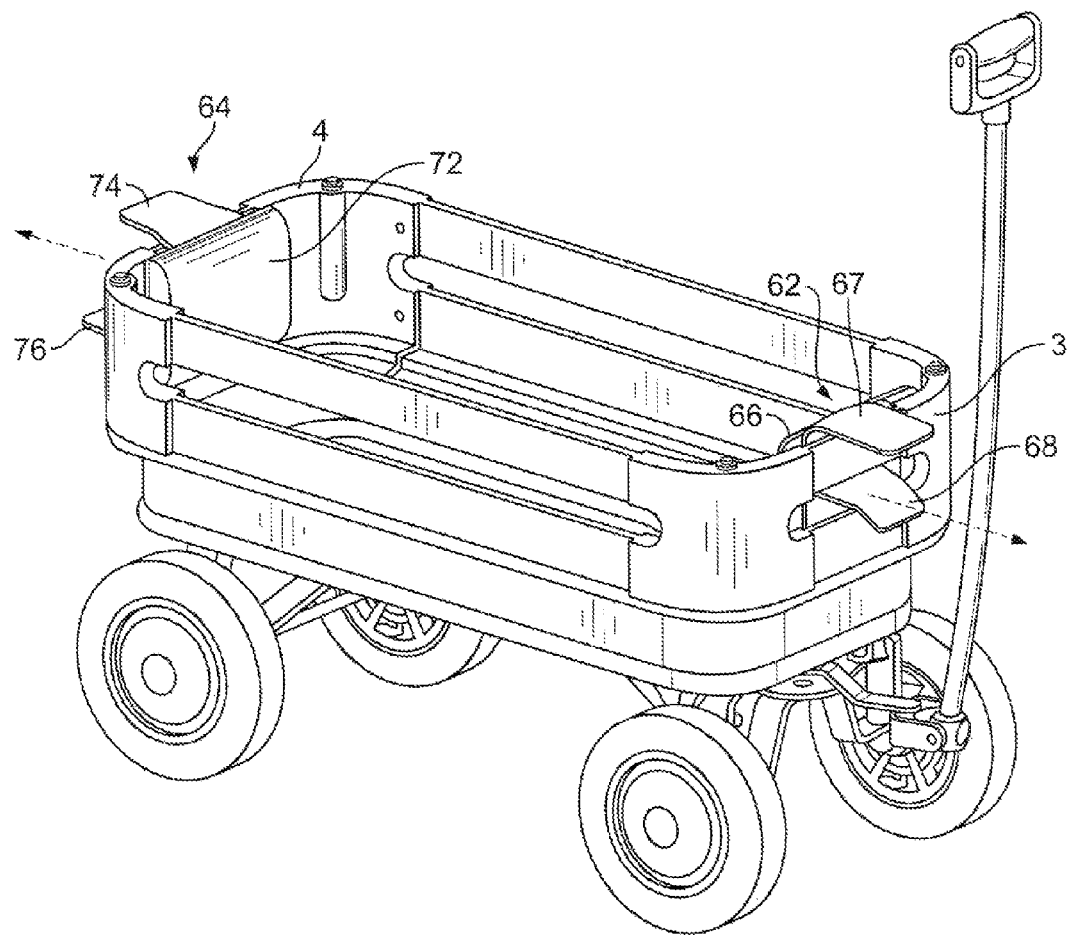
FIG. 11 is a perspective view of the seat pads and wagon of FIG. 10 illustrating installation of the seat pads to the wagon.

Front and rear seat pads, indicated in general at 62 and 64 in FIGS. 10 and 11, are adapted to be attached to the wagon front and rear sidewalls 3 and 4, respectively. Front seat pad 62 includes a pad portion 66, an upper flap 67 and a lower flap 68. Rear seat pad 64 similarly includes pad portion 72, an upper flap 74 and a lower flap 76. The pad portion of each seat pad preferably contains internal padding including 12 mm and 6 mm closed cell foam and 6 mm open cell foam. Alternatively, the padding may be any soft material including suitable insulating or packing material. The upper and lower flaps each wrap around a portion of the sidewall of the wagon and connect to one another via a fastening arrangement to attach the seat pad to the wagon. More specifically, as illustrated for front seat pad 62 in FIG. 12A, upper flap 67 is positioned over the top edge of the front wall 3, while lower flap 68 passes through an opening 78 formed in the front sidewall 3 of the wagon. As illustrated in FIG. 12B, the lower flap is folded under first so that a panel 82 of a hook and loop fastener is exposed. The underside of upper flap 67 is provided with a panel of hook and loop fastener material that corresponds to panel 82 of the lower flap 68. As a result, when the upper flap 67 is folded down over the lower flap 68, as illustrated by arrow 83 in FIG. 12C, the front seat pad is secured to the front sidewall of the wagon. A similar operation is repeated to attach the rear seat pad 64 to the rear sidewall 4 of the wagon in a similar fashion. The fastening arrangement of the upper flap and lower flap preferably includes VELCRO (hook and loop fastening material), but alternatively zippers, clamps, hooks, magnets, clips, buttons, snaps, ties, or any other suitable connectors may be used. Furthermore, the upper flap and lower flap of either seat pad may be replaced with a single flap that wraps around the sidewall and engages itself to attach to the sidewall. In addition, the seat pad flaps may be replaced with a single piece of material that permanently attaches the seat pad to the wagon. Each seat pad 62 and 64 allows a passenger to lean against it while riding in the wagon for greater comfort.

Figure 13:
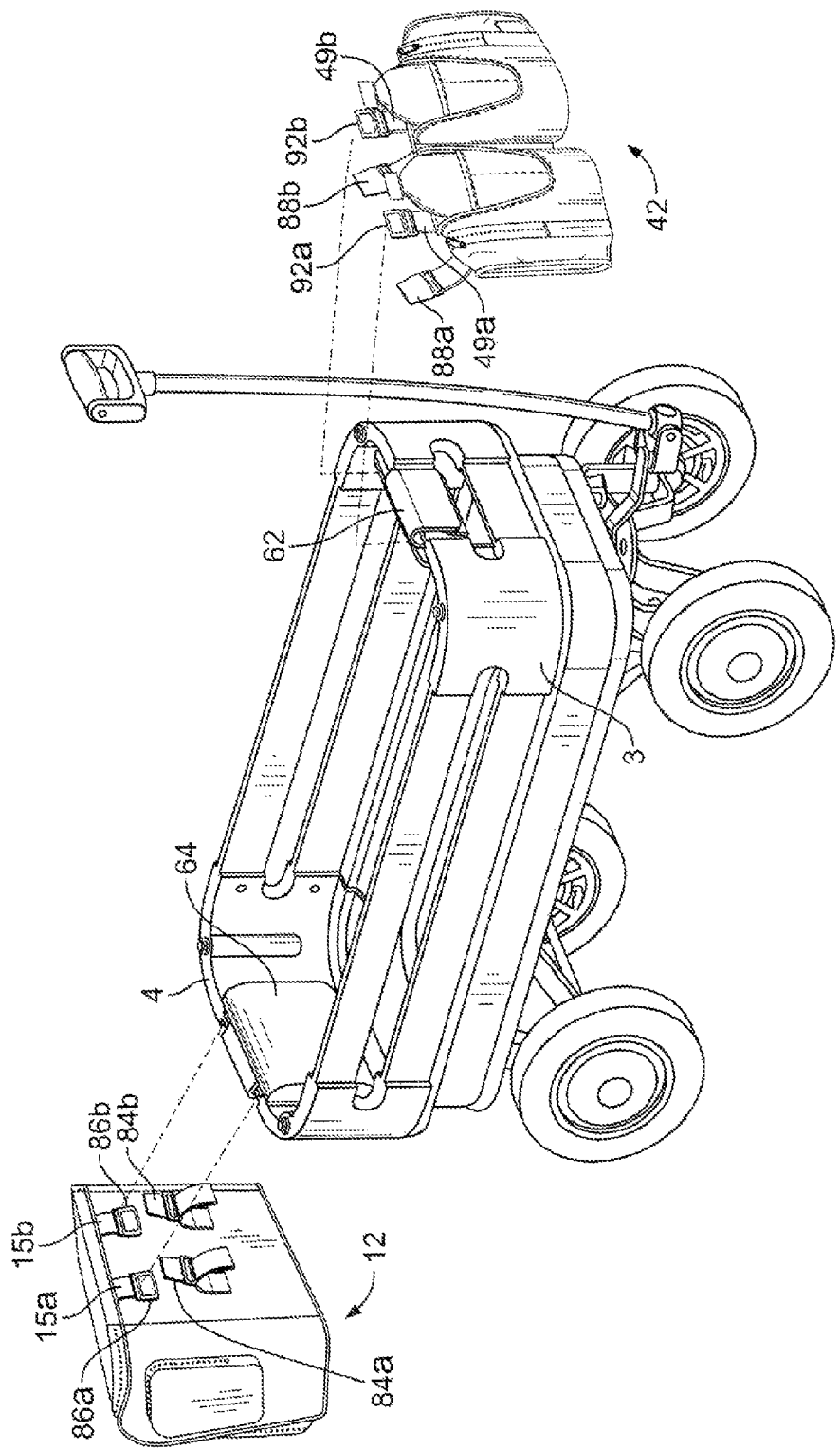
FIG. 13 is a perspective view the wagon of FIGS. 1, 10 and 11 with the front and rear seat pads installed and illustrating installation of the collapsible storage bag of FIGS. 2-6 and the accessory bag of FIGS. 7-9.
Figure 15:
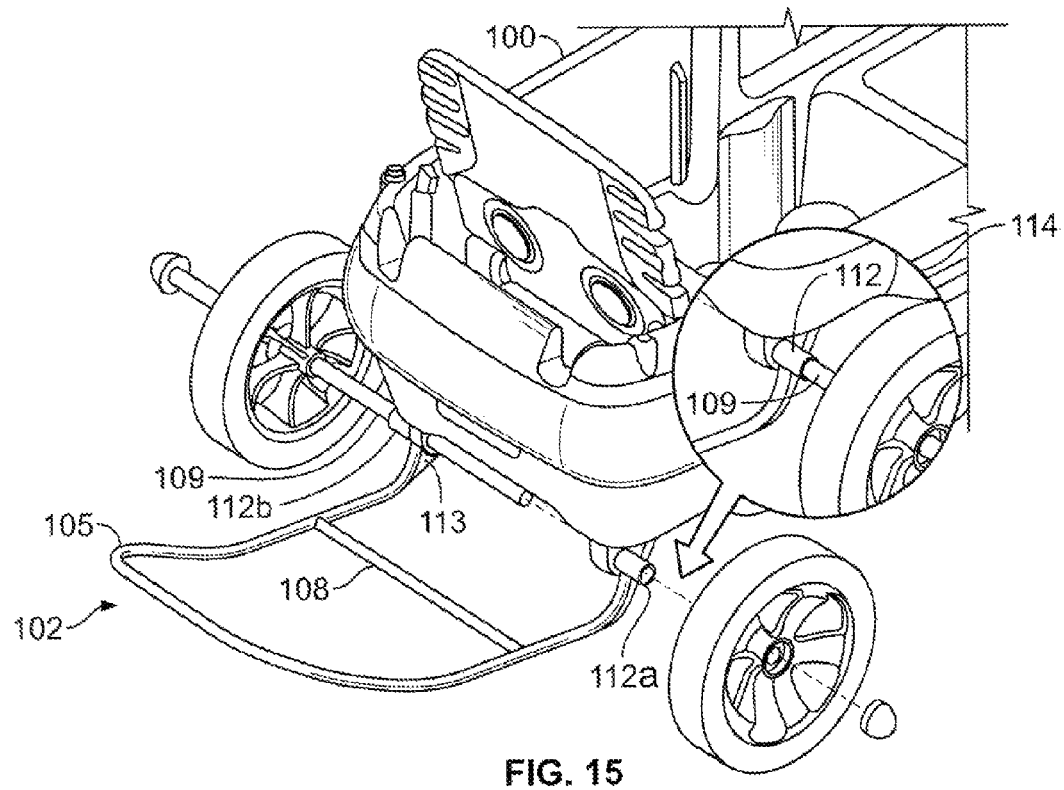
FIG. 15 is a perspective view of a rear portion of a wagon and the pivoting frame in a second embodiment of the storage bag system of the invention.

As illustrated in FIG. 13, connector straps 15a and 15b of collapsible storage bag 12 are provided with insertion buckles 84a and 84b, respectively, adapted to engage receiving buckles 86a and 86b. The connector straps 49a and 49b of accessory bag 42 are similarly provided with insertion buckles 88a and 88b, respectively, adapted to engage receiving buckles 92a and 92b. Alternatively the connector straps may be provided with a pair (or any number) of VELCRO connectors, zippers, clamps, hooks, magnets, clips, buttons, snaps, ties, or any other suitable connector.

As illustrated in FIGS. 14A-14D, the connector straps 15a and 15b of collapsible storage bag 12 wrap around the rear sidewall of the wagon and the insertion buckles 84a and 84b engage the receiving buckles 86a and 86b to attach the collapsible storage bag 12 against the outside of the wagon rear sidewall 4. As illustrated in FIG. 14C, the two connector straps 15a and 15b of the collapsible storage bag 12 are positioned on opposite sides of the upper flap 74 of the rear seat pad 64 installed on the interior surface of the rear sidewall. This creates an integrated assembly with the sidewall, and one where the bag and the seat pad do not interfere with one another. As indicated in FIG. 13, the connector straps 49a and 49b of the accessory bag 42 attach to the front sidewall 3 of the wagon in a similar fashion with respect to the upper flap 67 of the front seat pad 62.

A second embodiment of the storage bag system of the invention will now be described with respect to FIGS. 15-22D. The collapsible storage bag in this embodiment is supported on the back of the wagon 100 by a pivoting frame, indicated in general at 102 in FIGS. 15, 16A and 16B. The pivoting frame is preferably constructed from rigid steel wire and features a U-shaped portion 105, a cross member 108 and a pair of a pair of sleeves 112a and 112b attached to the ends of the U-shaped portion of the pivoting frame. The sleeves 112a and 112b receive the rear axle 109 of the wagon (see detail illustration 114 of FIG. 15). As a result, the pivoting frame 102 pivots about an axis defined by the rear axle 109 of the wagon between the raised position, illustrated in FIG. 16A, and the lowered position, illustrated in FIGS. 15 and 16B. The pivoting frame also includes a stop 117, which engages the bottom 118 of the wagon 100 to restrict rotation and/or pivoting of the moveable brace beyond the lowered position.

It is to be understood that the pivoting frame 102 could alternatively be pivotally attached directly to the wagon body, instead of to the axle of the wagon, such as by a pin, bolt, separate axle or other pivotal fastening arrangements.

Figure 18:
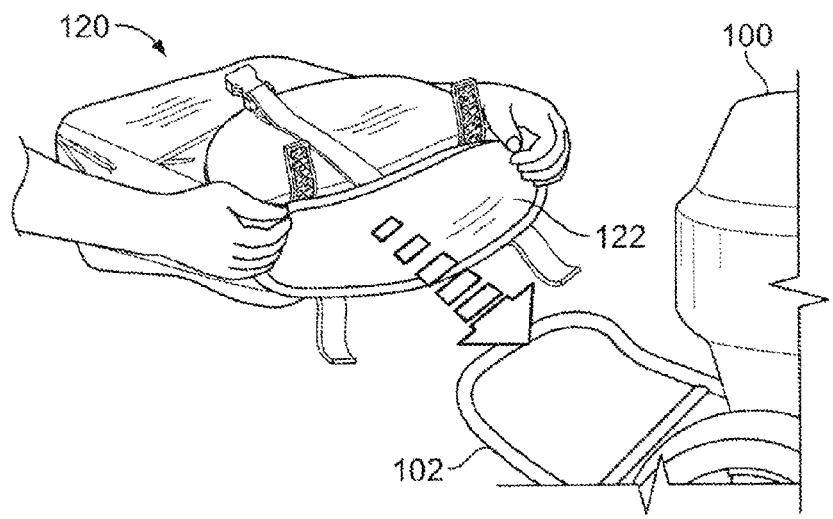
FIG. 18 is a perspective view illustrating installation of the collapsible storage bag on the pivoting frame of FIGS. 15-16B.
Figure 19:
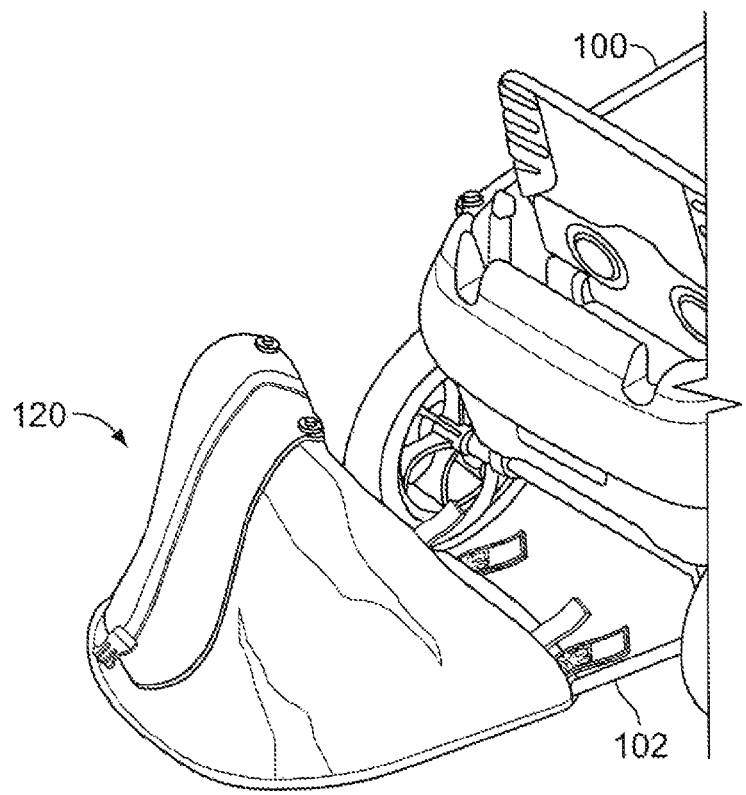
FIG. 19 is a perspective view of the rear portion of the wagon of FIGS. 15-16B illustrating the collapsible storage bag partially installed on the pivoting frame and in a partially expanded configuration.
Figure 20:
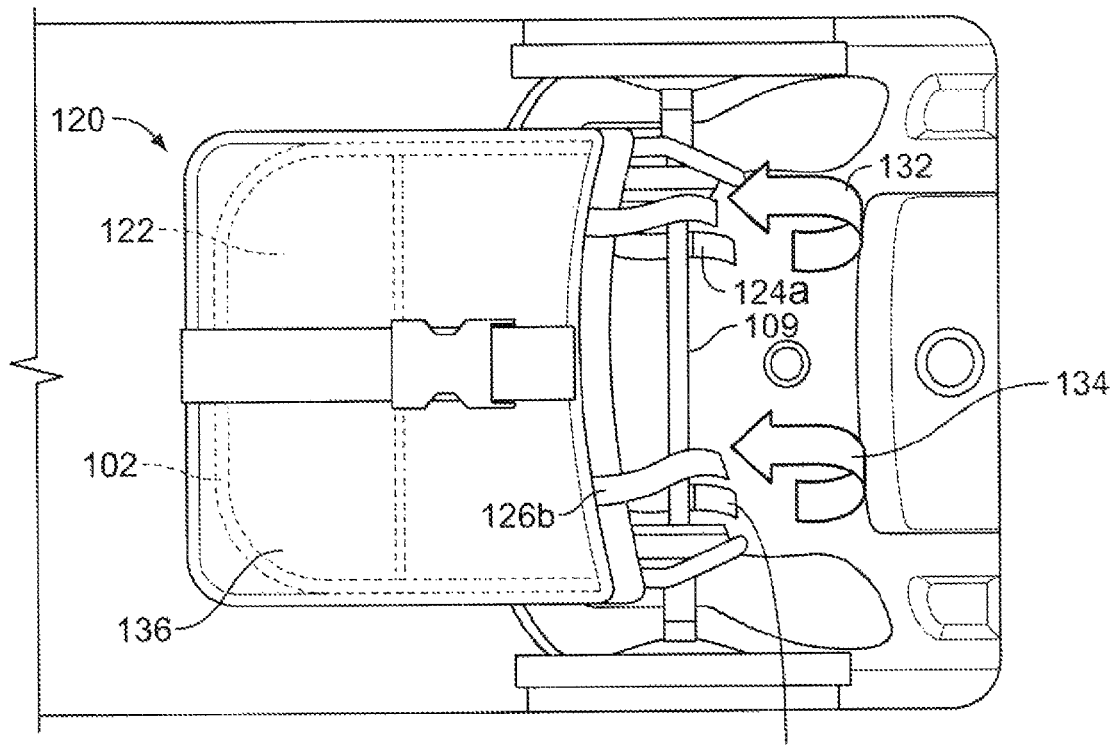
FIG. 20 is a bottom plan view of the wagon of FIG. 19 illustrating installation of the collapsible storage bag to the rear axle of the wagon.

A collapsible storage bag for the second embodiment of the storage bag system is indicated in 120 in FIGS. 17-20. The bag includes a frame pocket 122 having an opening and adjacent connector straps 124a and 124b and 126a and 126b. Straps 124a and 126a are provided with mating hook and loop fasteners (such as VELCRO), as are straps 124b and 126b. While the connector straps feature fasteners such as VELCRO, zippers, clamps, hooks, magnets, clips, buttons, snaps, ties, or any other suitable connector so that the connector straps may be passed around the axle and fastened together (as explained below) may be used. As illustrated in FIGS. 18 and 19, a user attaches the collapsible storage bag 120 to the pivoting frame 102 by placing the pivoting frame 102 within the frame pocket 122. Pivoting frame 102 is also shown in phantom fully inserted into pocket 122 in FIG. 20. Next, as illustrated by arrows 132 and 134 of FIG. 20, the straps 124a, 126a and 124b, 126b are fastened together around wagon rear axle 109. As a result, the pivoting frame, and thus the bottom 136 of the bag 120, is pivotally secured to the rear axle of the wagon.

The surface material of the collapsible storage bag 120 is preferably a combination of polyester, nylon, tricot, or fleece but alternatively may be leather, wool cloth, burlap, or any other suitable alternative or any combination of the foregoing.

Figure 21A:
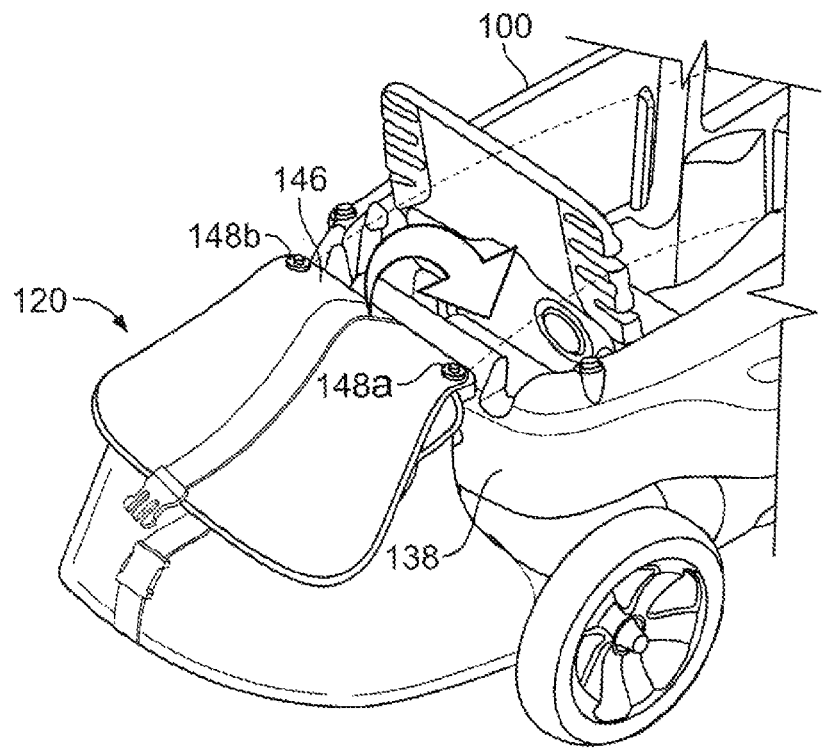
FIGS. 21A and 21B are rear and front perspective views of the rear portion of the wagon of FIGS. 18-20 illustrating the installation of the top portion of the collapsible storage bag to the rear sidewall of the wagon.
Figure 21B:
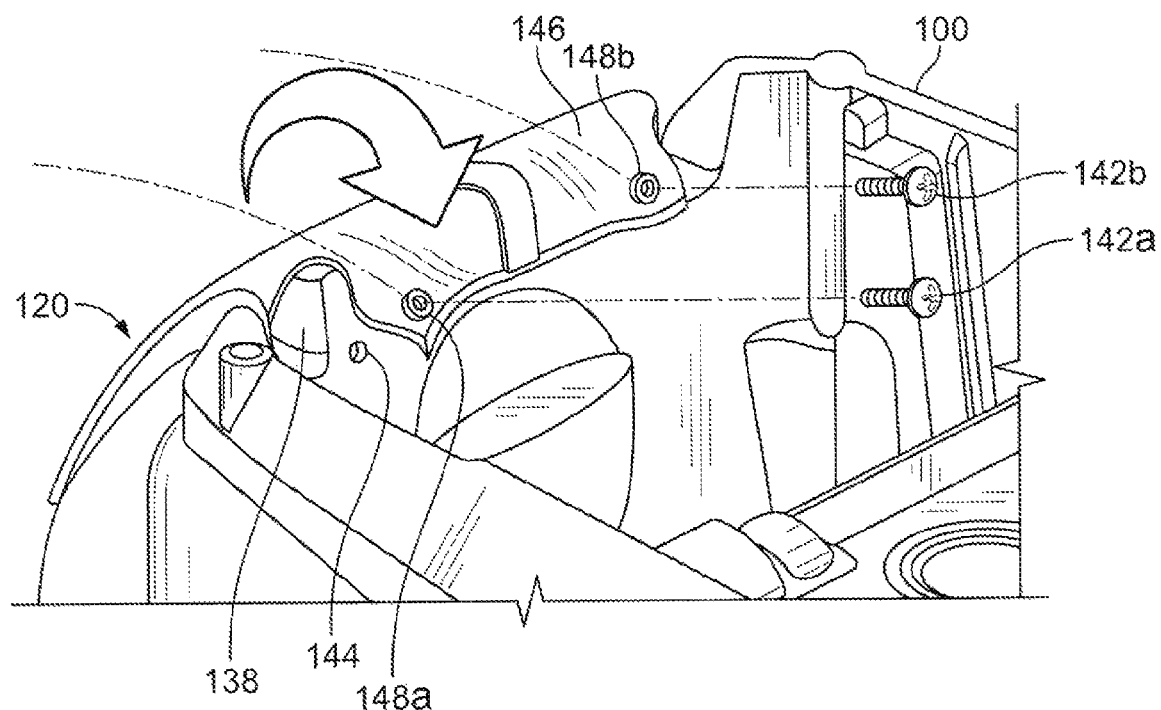

As illustrated in FIGS. 21A and 21B, the rear sidewall 138 of the wagon 100 supports and is attached to the collapsible storage bag 120 via connectors in the form of a pair of removable screws 142a and 142b. More specifically, as illustrated FIGS. 21A and 21B, the rear wall of the wagon 138 contains a pair of apertures 144 (FIG. 21B) on its inner surface, and the collapsible storage bag 120 features a connector flap 146. The flap 146 is provided with a pair of holes 148a and 148b through which the removable screws are interchangeably inserted and removed. A user attaches the top portion of the collapsible storage bag 120 to the wagon by placing the connector flap 146 of the collapsible storage bag over the top edge of the rear sidewall 138 of the wagon, aligning the holes 148a and 148b of the flap 146 of the collapsible storage bag with the apertures 144 of the wagon, as illustrated in FIG. 21B, and inserting the removable screws through the holes and into the apertures, thereby securing the top portion of the collapsible storage bag to the rear sidewall 138 of the wagon. Of course fasteners other than removable bolts may be used to secure the flap of the bag to the wagon rear sidewall. These fasteners include, but are not limited to, a bolt, plug, plastic fitting, or any other suitable alternative. Rivets or the like may alternatively be used for a permanent connection. Also, the removable connection formed by the removable screws, apertures, and holes alternatively may be a sliding connection, magnetic connection, adhesive connection, VELCRO connection, or any other suitable alternative.

Figure 22A:
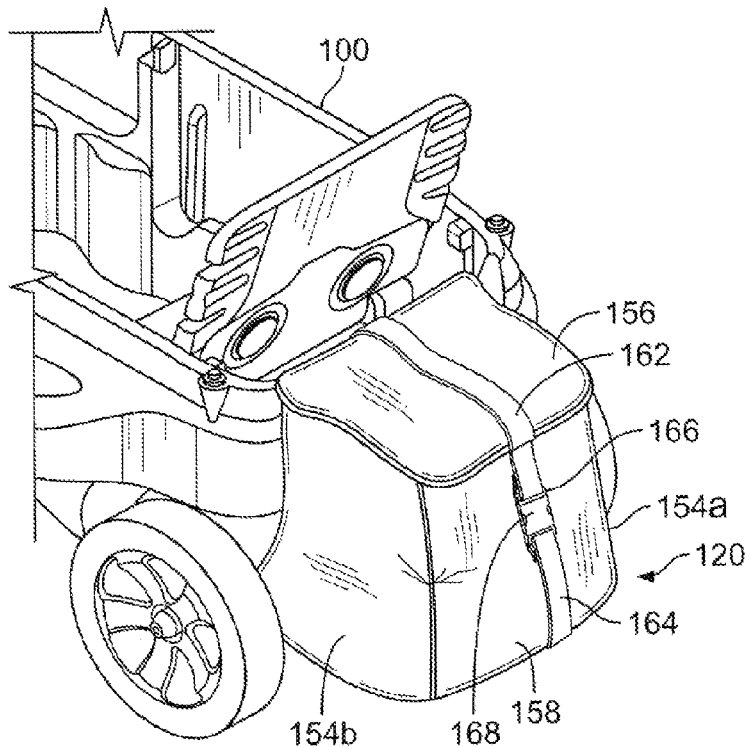
FIGS. 22A-22D are perspective views of the rear portion of the wagon of FIGS. 18-21B with the collapsible storage bag installed and illustrating movement of the bag from the expanded configuration to the collapsed configuration.
Figure 22B:
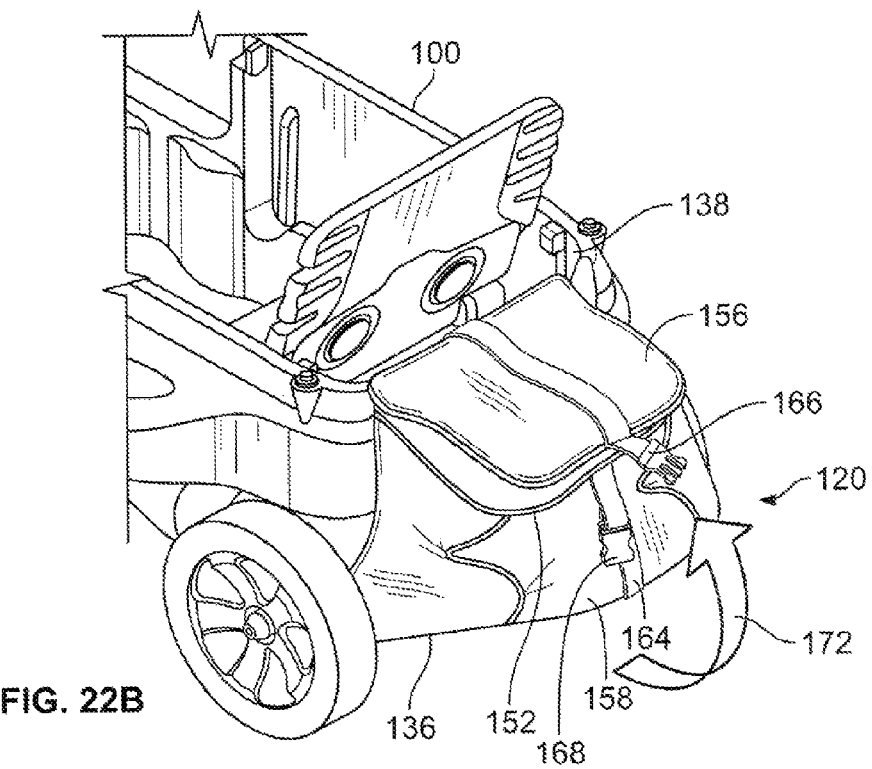
Figure 22C:
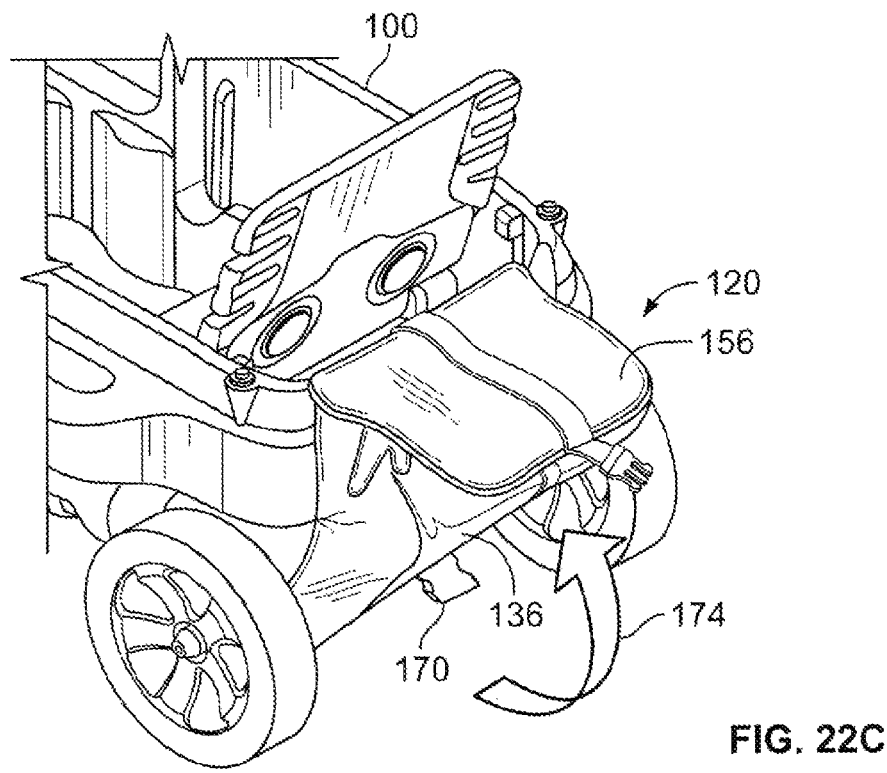
Figure 22D:
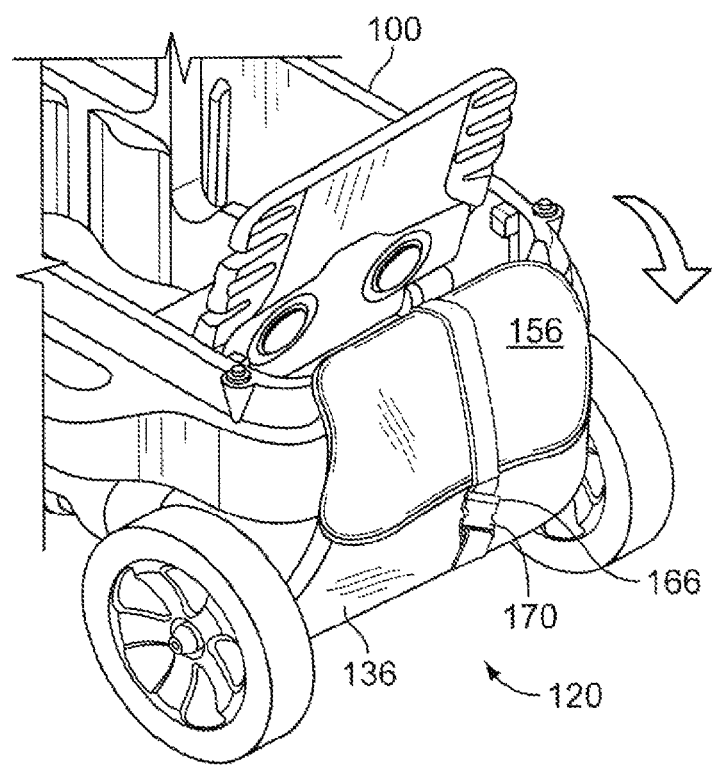

As illustrated in FIGS. 22A-22D, the collapsible storage bag, indicated in general at 120 and attached to the rear sidewall of wagon 100, includes an open top 152 (FIG. 22B), a pair of opposing side walls 154a and 154b, a lid 156, a rear wall 158 and the bottom 136 (FIG. 22D). As will now be explained, the collapsible storage bag can folded or collapsed from the expanded configuration illustrated in FIG. 22A into the collapsed configuration shown in FIG. 22D.

The lid 156 includes a strap 162 while the rear wall and bottom of the collapsible storage bag each include a strap 164. The straps are preferably sewn to the collapsible storage bag 120, but alternatively may be glued, bonded with adhesive, or attached in any other suitable manner. The strap 162 disposed on the lid is provided with a lid fastener in the form of an insertion buckle 166, and the strap 164 disposed on the bottom and rear wall of the collapsible storage bag is provided with rear wall fastener in the form of a rear wall receiving buckle 168 (FIGS. 22A and 22B) and a bottom fastener in the form of bottom receiving buckle 170 (FIGS. 22C and 22D), respectively. Alternatively the buckles may be replaced with a set of VELCRO connectors, zippers, clamps, hooks, magnets, clips, buttons, snaps, ties or any other suitable connecting device.

Figure 16A:
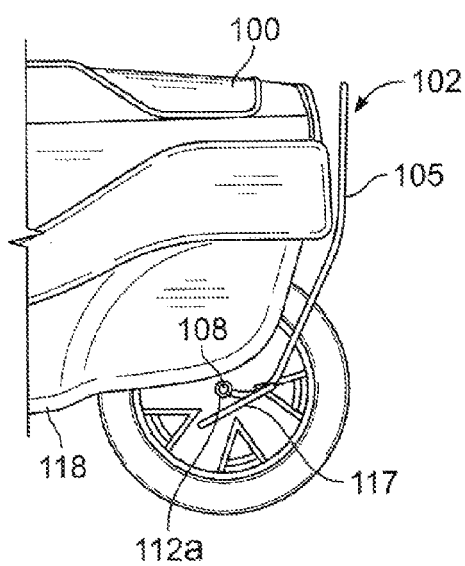
FIGS. 16A and 16B are side elevational views, with the wheel closest to the viewer removed, illustrating the pivoting frame in the raised and lowered positions, respectively.
Figure 16B:
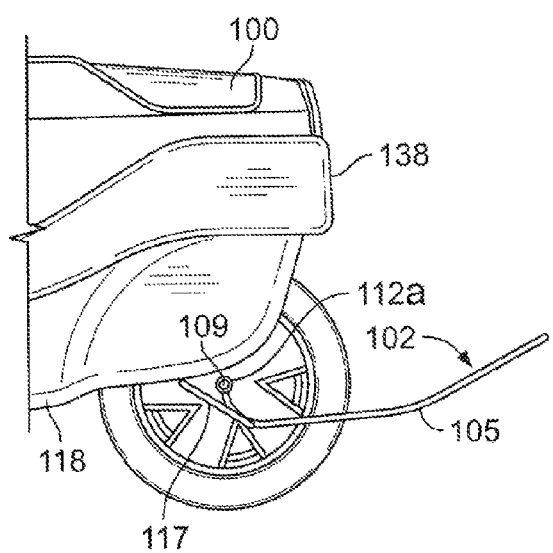
Figure 17:
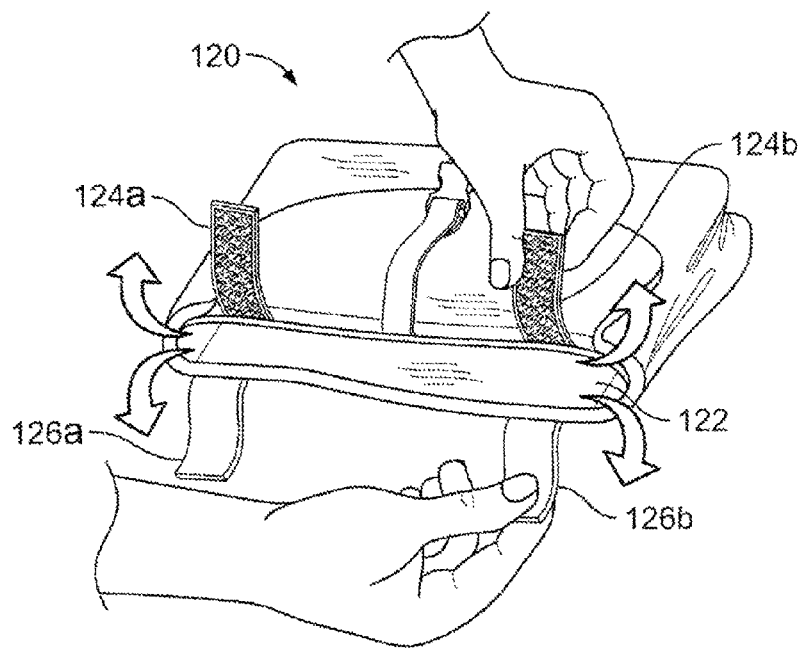
FIG. 17 is a perspective view of the collapsible storage bag of the second embodiment of the storage bag system of the invention illustrating opening of the frame pocket of the collapsible storage bag.

As illustrated in FIG. 22A, when the collapsible storage bag 120 is in the expanded configuration, the lid 156 may be used to cover the open top of the bag, with insertion buckle 166 engaging rear wall receiving buckle 168 to secure the lid in place. When in this expanded configuration, the pivoting frame is in the lowered position illustrated in FIGS. 15 and 16B. When the pivoting frame and collapsible storage bag are in the expanded configuration, as illustrated in FIG. 16B, the stop 117 engages the bottom of the wagon 118 and supports the moveable brace, the collapsible storage bag, and any articles placed inside of the collapsible storage bag during normal use of the wagon.

To fold the bag 120 into the collapsed configuration, the first step is for the user to disconnect the insertion buckle 166 from the rear wall receiving buckle 168, as illustrated in FIG. 22B. The user next pivots the bottom 136 of the bag towards the rear sidewall 138 of the wagon, as indicated by arrow 172. In doing so, the pivoting frame 102 of FIG. 16B pivots counterclockwise. This motion is continued, as illustrated in FIG. 22C by arrow 174, while the lid 156 of the bag is raised so that the pivoting frame and collapsing bag may pass beneath it. Next, as illustrated in FIG. 22D, with the lid 156 of the bag overlying the bottom 136 of the bag, the lid insertion buckle 166 is placed into engagement with the bottom receiving buckle 170. As a result, the bag 120 is secured in the collapsed configuration illustrated in FIG. 22D. When the bag is in the collapsed configuration illustrated in FIG. 22D, the pivoting frame 102 is in the raised position illustrated in FIG. 16A. As a result, when the bag is in the collapsed configuration, the pivoting frame, and thus the collapsible storage bag, are positioned compactly against the exterior surface of the rear sidewall of the wagon.

Figure 23:
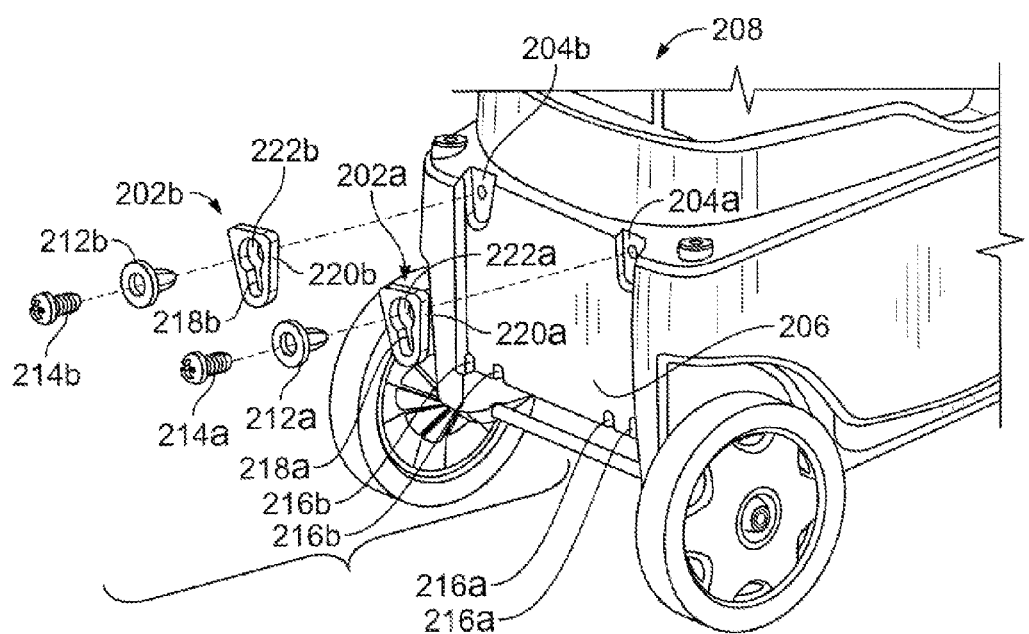
FIG. 23 is a perspective view of the rear portion of a wagon in accordance with a third embodiment of the storage bag system of the invention.

A third embodiment of the storage bag system of the invention will now be described with respect to FIGS. 23-27. As illustrated in FIG. 23, a pair of slot connectors, indicated in general at 202a and 202b, are positioned within recesses 204a and 204b formed in the rear sidewall 206 of a wagon, indicated in general at 208. The slot connectors are secured in position by inserts 212a and 212b and screws 214a and 214b. Of course, alternative fastening arrangements including, but not limited to, adhesive or rivets, may be used to secure the slot connectors within the recesses. In addition, the slot connectors could alternatively be integrally molded into the rear sidewall 206 of the wagon.

A first pair of notches 216a and a second pair of notches 216b are formed in the bottom edge of the rear sidewall 206 as well.

As illustrated in FIG. 23, Slot connector 202a includes a slot 218a that is surrounded by a base 220a. The slot has an enlarged portion 222a. Slot connector 202b similarly includes a slot 218b that is surrounded by a base 220b. The slot has an enlarged portion 222b.

Figure 24:
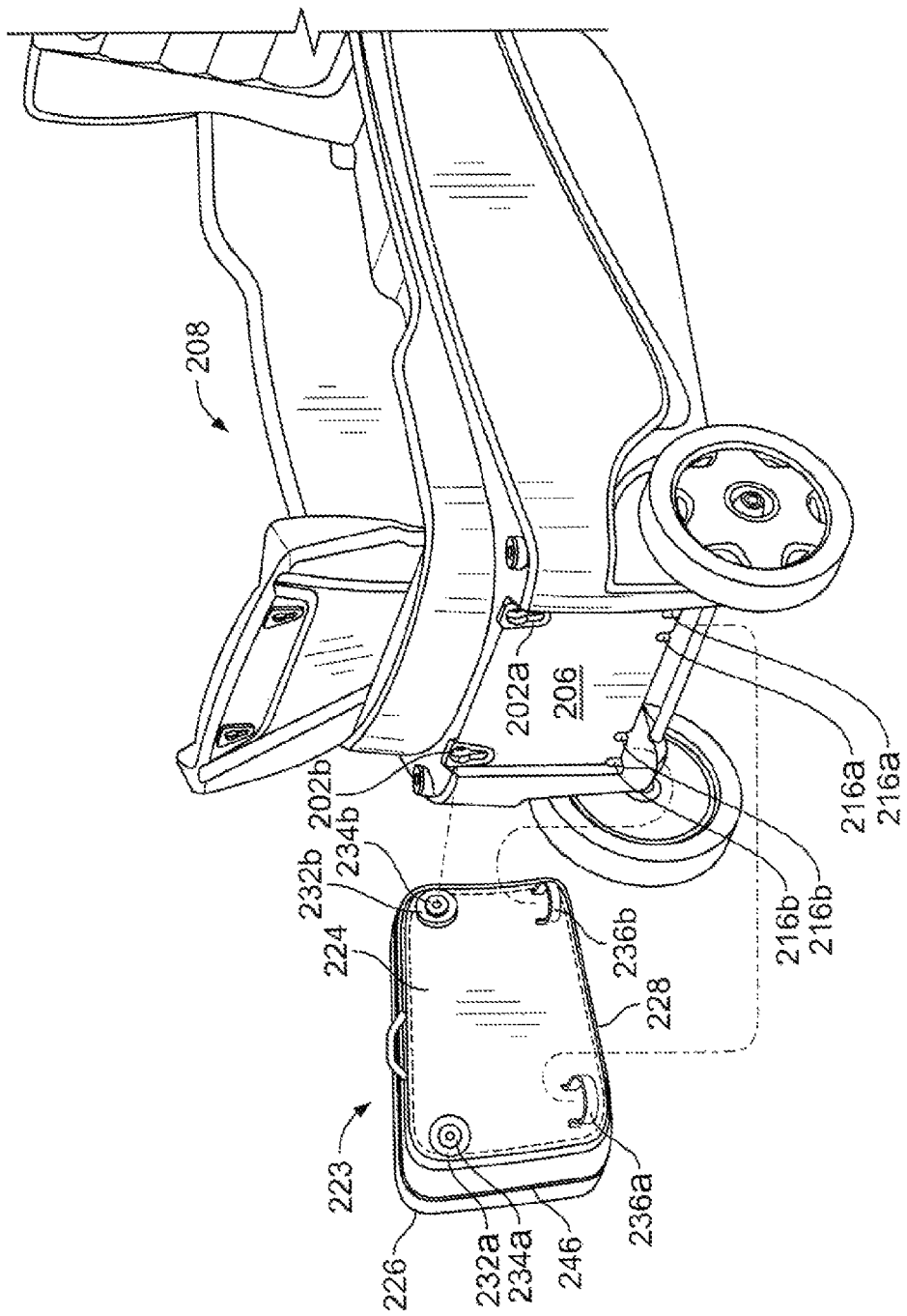
FIG. 24 is a perspective view of the rear portion of the wagon of FIG. 23 with a collapsible storage bag of the third embodiment of the invention in the collapsed configuration and in the process of being installed on the wagon rear sidewall.
Figure 25:
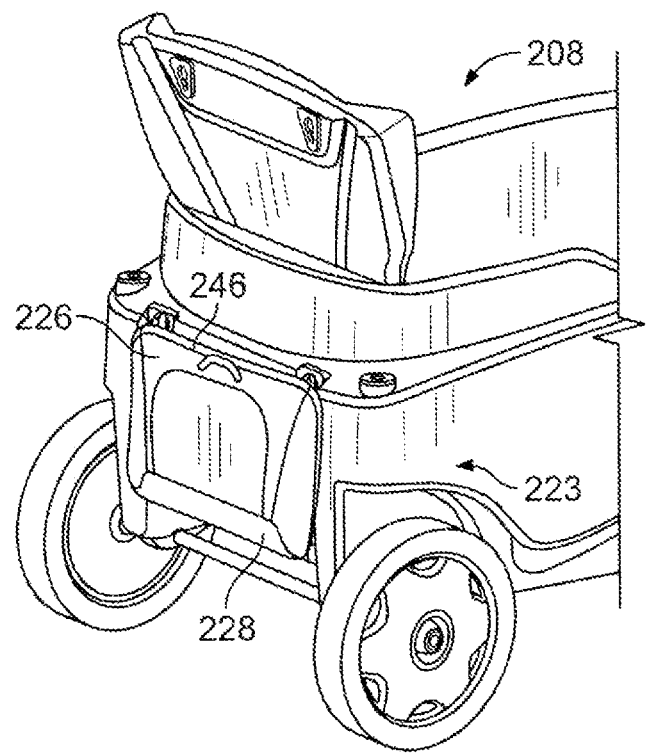
FIG. 25 is a perspective view of the rear portion of the wagon and collapsible storage bag of FIG. 24 with the storage bag installed on the rear sidewall of the wagon.

As illustrated in FIGS. 24 and 25, the collapsible storage bag in this embodiment, indicated in general at 223, includes a back panel 224 and a cover 226 that are joined along their bottom edges by fabric so that a hinge 228 is formed. The back panel 224 preferably includes a board that maintains the rigidity of the collapsible storage bag. The board is preferably 1 mm polyethylene (PE) board, but alternatively may be any suitable rigid or semi-rigid material, and is preferably located inside of the collapsible storage bag to form the rigid or semi-rigid back panel. The surface material of the collapsible storage bag 223 preferably includes polyester, nylon, tricot, or fleece but alternatively may be leather, wool cloth, burlap, or any other suitable alternative or any combination of the foregoing.

As illustrated in FIG. 24, the back panel 224 is provided with knob connectors 232a and 232b. Each knob connector features an enlarged head portion 234a and 234b that is connected to the base of the connector by a corresponding shaft. The enlarged head portions 234a and 234b of the knob connectors are sized to pass through the enlarged portions 222a and 222b of the slot connectors 202a and 202b, respectively, but not the remaining portions of the slots 218a and 218b. Once the enlarged head portions 234a and 234b of the knobs are inserted through the enlarged portions 222a and 222b of the slots, the shafts of the knob connectors 232a and 232b slide through the remaining portion of the slots 218a and 218b so that the knob connectors may be slid downward and into locking engagement with the slot connectors 202a and 202b. The process is reversed to disconnect the knob and slot connectors.

The knob connectors and slot connectors are preferably constructed from DURAFLEX, but alternatively may be plastic, wood, metal, or any other suitable material.

As further illustrated in FIG. 24, the back panel 224 of the collapsible storage bag 223 also is provided with a pair of elastic loops 236a and 236b. The loops are sized and positioned so as to engage the first and second pair of notches 216a and 216b formed in the bottom edge of the rear sidewall 206 when the knob connectors 232a and 232b are connected to the slot connectors 202a and 202b.

In view of the above, the collapsible storage bag, shown in the collapsed configuration in FIGS. 24 and 25, may be installed to the rear sidewall 206 of the wagon by connecting the knob connectors 232a and 232b to the slot connectors 202a and 202b as described above. The elastic loops 236a and 236b are then positioned through the notches 216a and 216b. As a result, the collapsible storage bag 223 is attached to the rear wall of the wagon 208, as illustrated in FIG. 25, in a compact and secure configuration.

Figure 26:
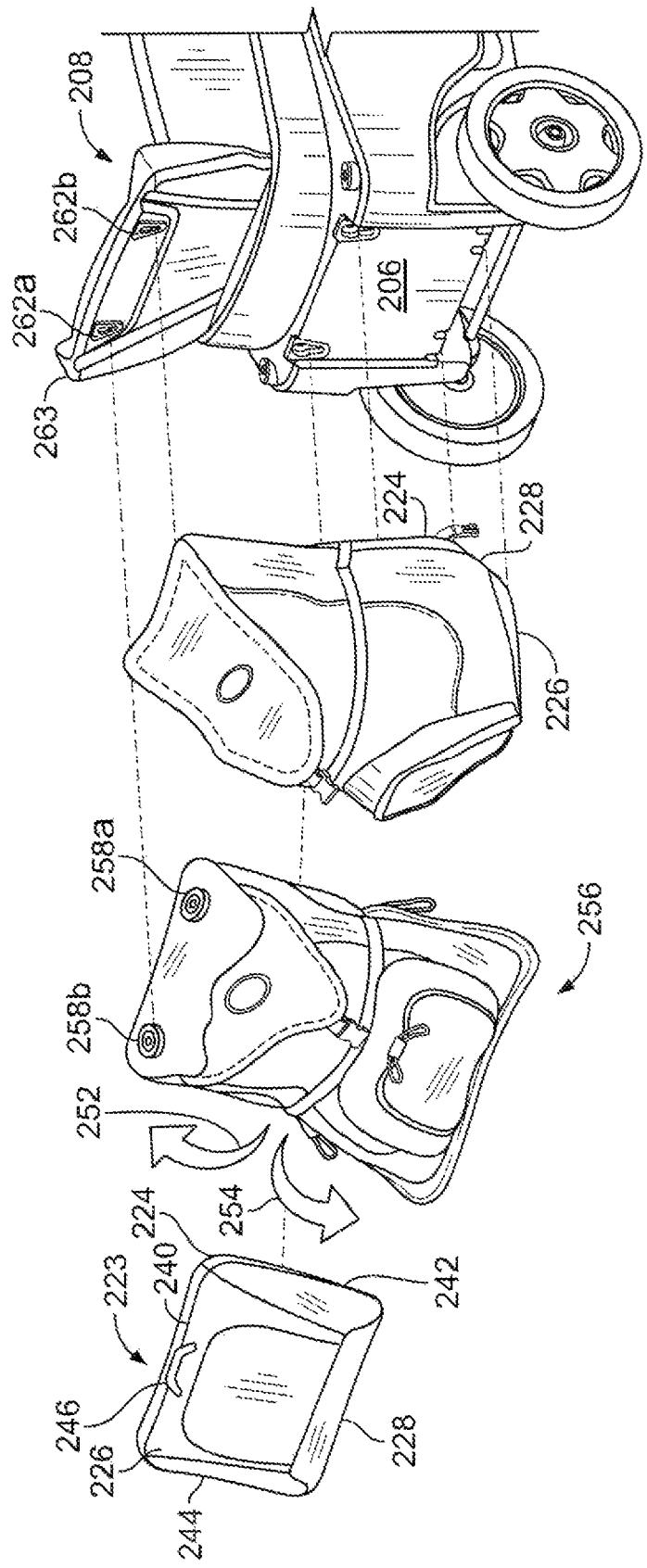
FIG. 26 is a perspective view of the rear portion of the wagon of FIGS. 23 and 24 with the collapsible storage bag of the third embodiment being moved into the expanded configuration and in the process of being installed on the wagon rear sidewall.

With reference to FIG. 26, the top and side edges 240, 242 and 244 of the back panel 204 and cover 206 are provided with a zipper 246 that closes the top and side edges of the back panel and cover together when in the closed condition. The remainder of the bag is folded and stored inside of the "clamshell" formed by the back panel and cover when the zipper is in the closed condition and when the collapsible storage bag is in the collapsed configuration.

Figure 27:
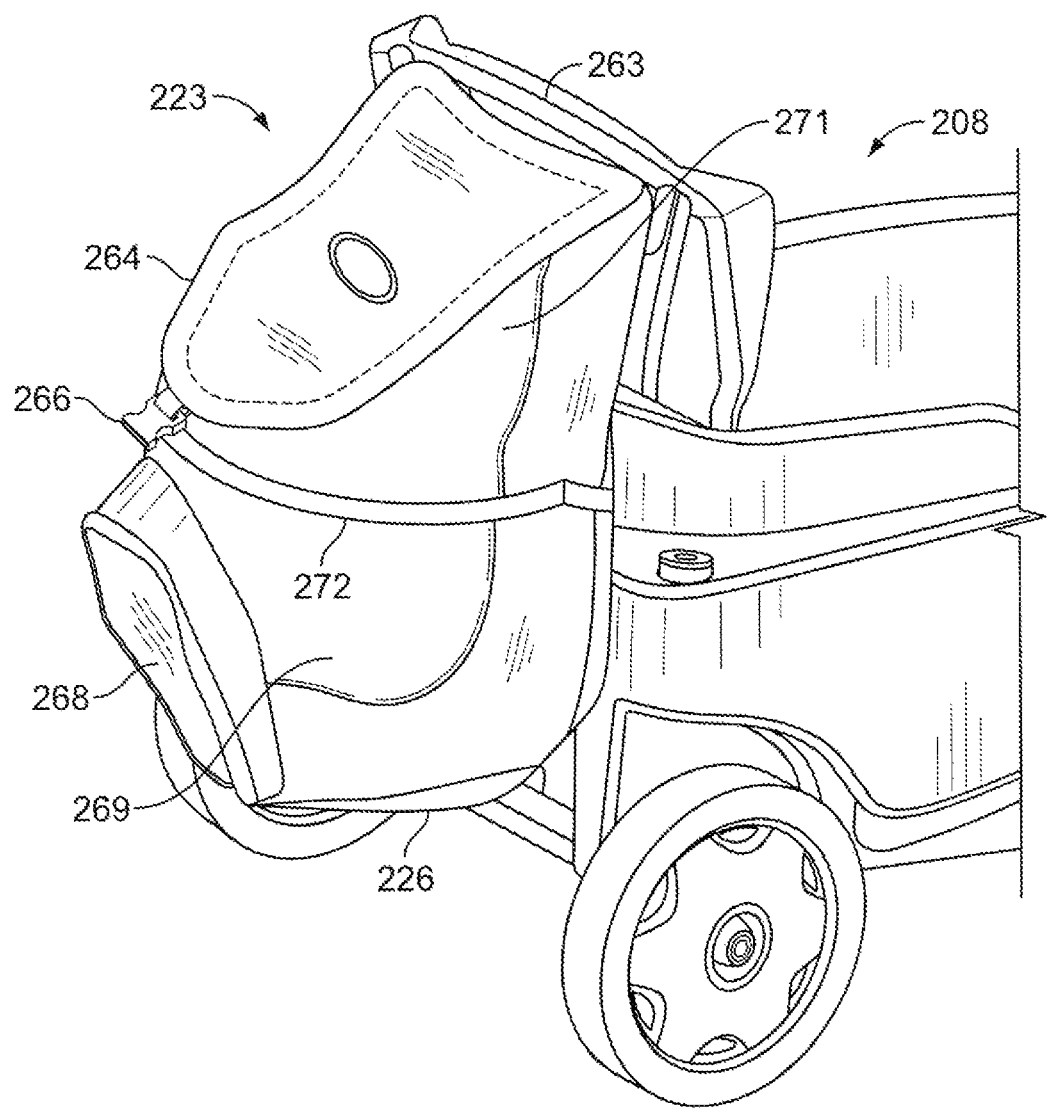
FIG. 27 is a perspective view of the wagon and collapsible storage bag of FIG. 26 with the storage bag in the expanded configuration and installed on the rear sidewall of the wagon.

The collapsible storage bag 223 may be placed in the expanded configuration illustrated in FIG. 27 by, with reference to FIG. 26, first unzipping zipper 246 to place it in the open condition and unfolding and expanding the bag as illustrated by arrows 252 and 254 for the bag in an intermediate configuration indicated in general at 256. As illustrated by the intermediate configuration 256 of the bag, a second, upper pair of knob connectors 258a and 258b are positioned near the upper end of the bag and, when the bag is in the expanded configuration, connect to a pair of slot connectors 262a and 262b, formed in the backside of folding seat 263 of the wagon 208, as illustrated in FIG. 27. Knob connectors 258a and 258b feature the same construction as knob connectors 232a and 232b, while slot connectors 262a and 262b feature the same construction as slot connectors 202a and 202b and thus operate in the same manner.

With reference to FIG. 27, the top of the collapsible storage bag 223, when in the expanded configuration, is open and is provided with a lid 264 and corresponding fastener 266 to cover the open top. When in the expanded configuration, a zippered front pocket 268 is also exposed.

The collapsible storage bag is preferably provided with a lower portion 269 that contains an insulated lower compartment that is separated from the un-insulated, upper compartment of upper portion 271, by a zip-out interior wall (not shown). The contents of the insulated lower compartment of the bag may be accessed, without disturbing the contents of the upper compartment, via zipper 272 of FIG. 27. The zip-out interior wall is positioned around the interior surface of the upper portion 271 of the bag 223 just above the zipper 272. The zip-out interior wall may be unzipped to convert the upper and lower compartments of the bag into a single large interior compartment.

A fourth embodiment of the storage bag system of the invention will now be described with respect to FIGS. 28A-32B. The collapsible storage bag of this embodiment is indicated in general at 310 in FIGS. 28A-28D and shown attached to the rear wall 311 of a wagon 312. The bag features a body 314, defining an interior compartment, and a lid 316. As will be explained in greater detail below, the bag also features a bottom 324 that is provided with a pivoting frame that pivots about the rear axle of the wagon 312. The surface material of the collapsible storage bag 310 preferably includes polyester, nylon, tricot, or fleece but alternatively may be leather, wool cloth, burlap, or any other suitable alternative or any combination of the foregoing.

Figure 28A:
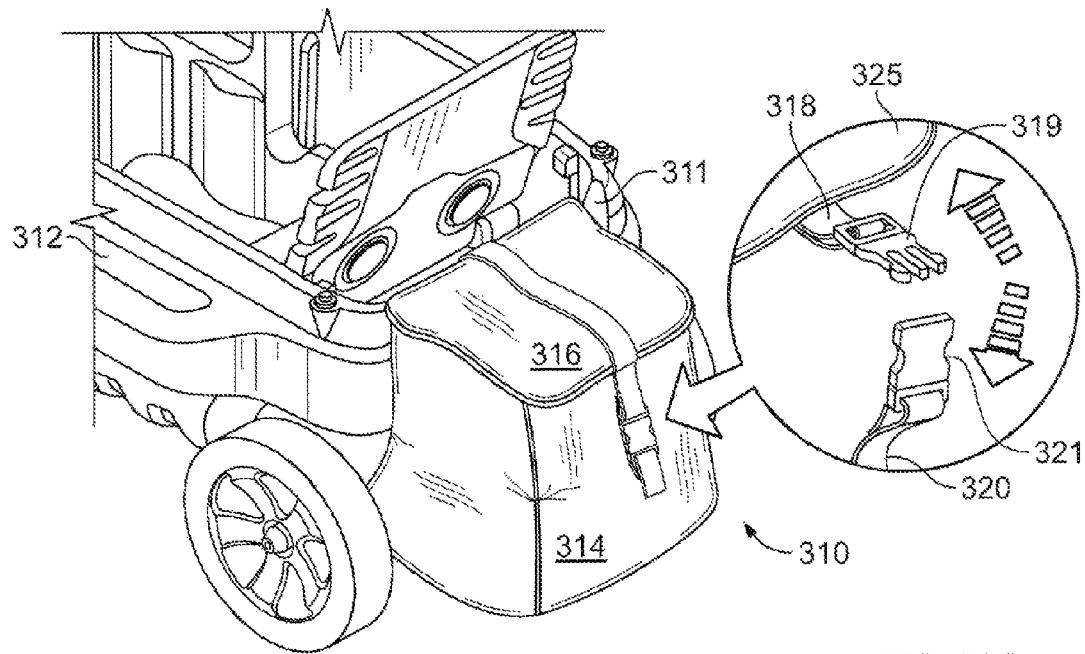
FIGS. 28A-28D are perspective views of a fourth embodiment of the storage bag system of the present invention mounted to the rear of a wagon and illustrating movement of the bag between the expanded and collapsed configurations.
Figure 28B:
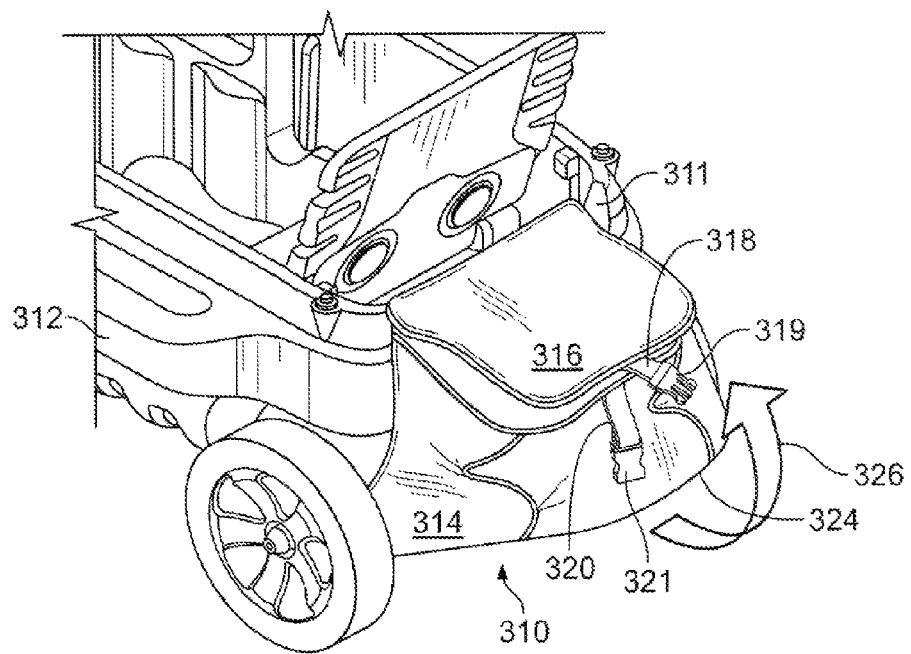
Figure 28C:
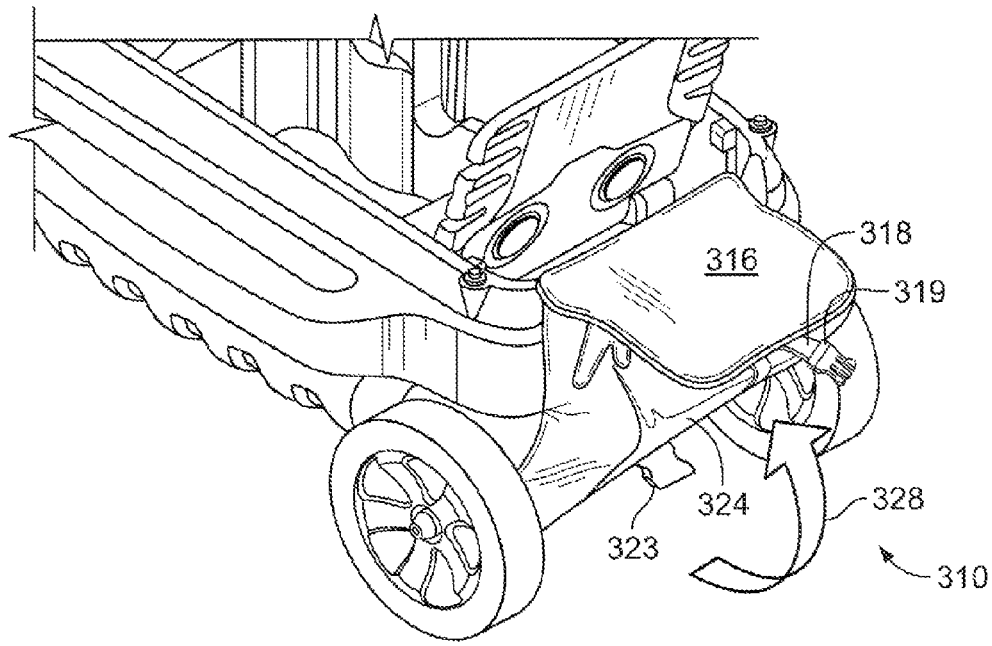
Figure 28D:
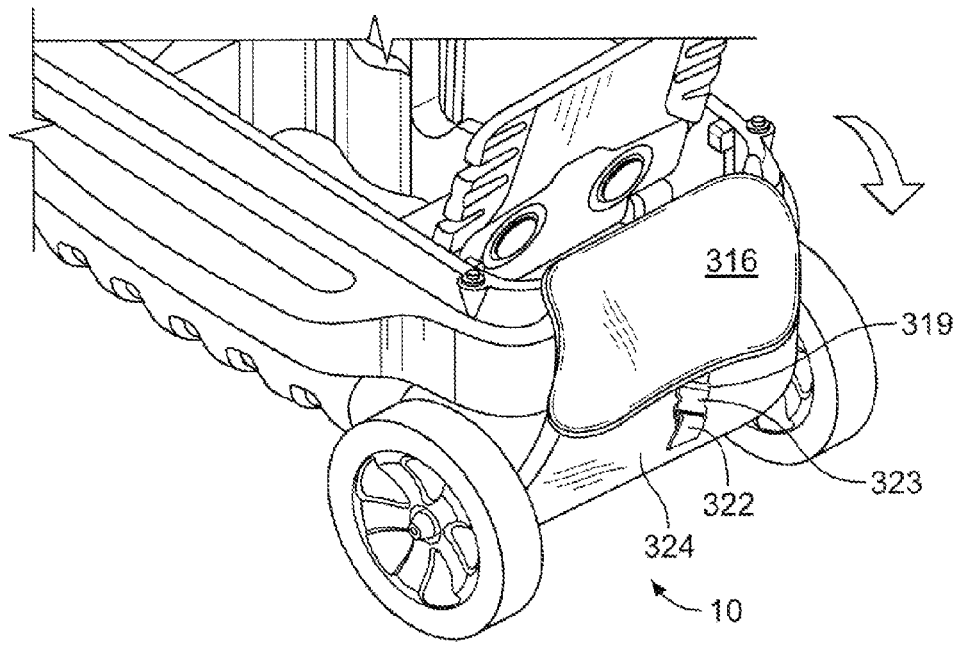

As illustrated in FIGS. 28A and 28B, the bag features a top strap 318 provided with a top fastener in the form of top insertion buckle 319 and rear wall strap 320 provided with a rear wall fastener in the form of rear wall receiving buckle 321. With reference to FIGS. 28C and 28D, the bag also features a bottom strap 322 provided with a bottom fastener in the form of bottom receiving buckle 323.

The bag may be folded from the expanded configuration, illustrated in FIG. 28A, to the collapsed configuration, illustrated in FIG. 28D, by removing the top insertion buckle 319 from the rear wall receiving buckle 321, as shown by enlarged view 325 of FIG. 28A, pivoting the bottom 324 of the bag counterclockwise or upwards, as shown by arrows 326 and 328 in FIGS. 28B and 28C, and fastening the top insertion buckle 319 to the bottom receiving buckle 323, as shown in FIG. 28D.

Figure 29A:
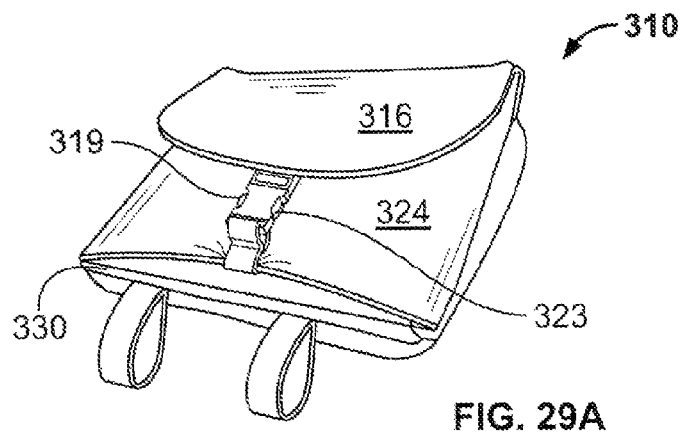
FIGS. 29A-29C are enlarged perspective views of the collapsible storage bag of FIGS. 28A-28D illustrating assembly of the pivoting frame to the bag.
Figure 29B:
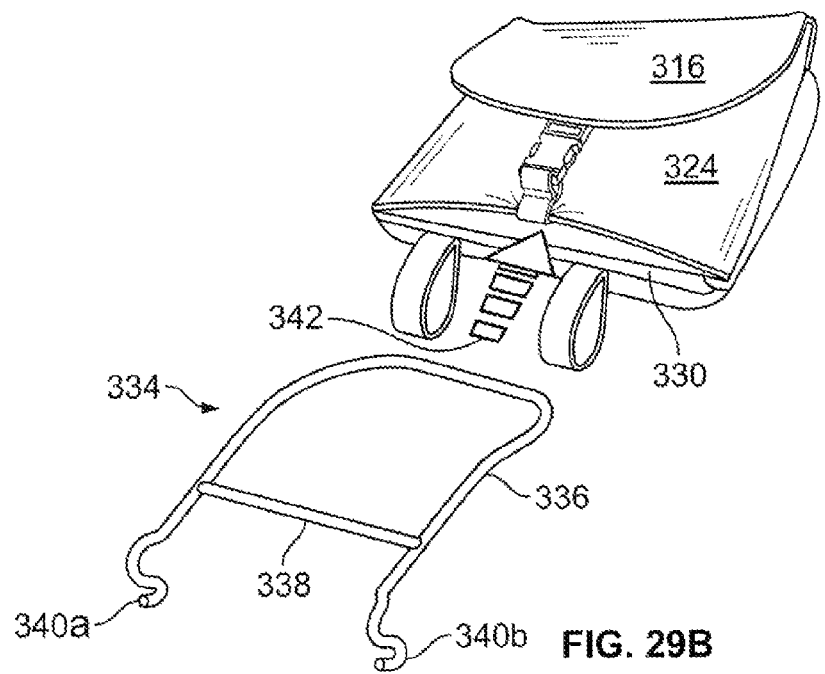
Figure 29C:
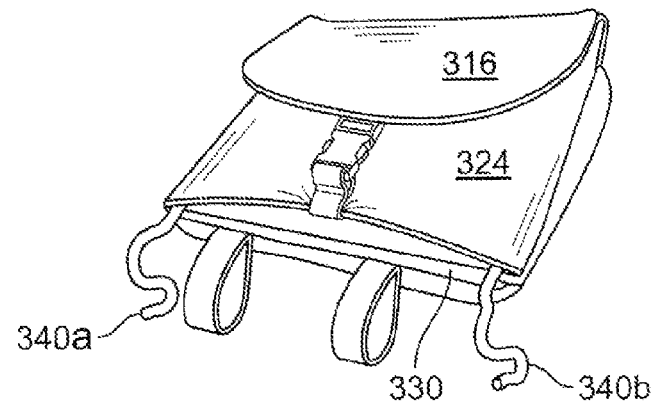

As shown in FIGS. 29A-29C, the collapsible storage bag 310 features a pocket 330 having an open bottom. As shown in FIG. 29B, a pivoting frame, indicated in general at 334, is preferably constructed from rigid steel wire and features a U-shaped portion 336, a cross member 338 and a pair of generally C-shaped end portions 340a and 340b. As indicated by arrow 342 in FIG. 29B, the U-shaped portion 336 of the pivoting frame is inserted into the pocket 330 of the bag 310. As a result, as illustrated in FIG. 29C, only the C-shaped end portions 340a and 340b of the pivoting frame are exposed.

FIGS. 30A-30D show the steps for attaching the bag 310 to a wagon, after the pivoting frame has been inserted, as described with respect to FIGS. 29A-29C. The bottom of the bag is provided with hook and loop fastener straps 350a, 352a and 350b, 352b. Other attachment or fastening arrangements known in the art may be substituted for the hook and loop fastener (VELCRO) of straps 350a, 352a and 350b, 352b.

Figure 30A:
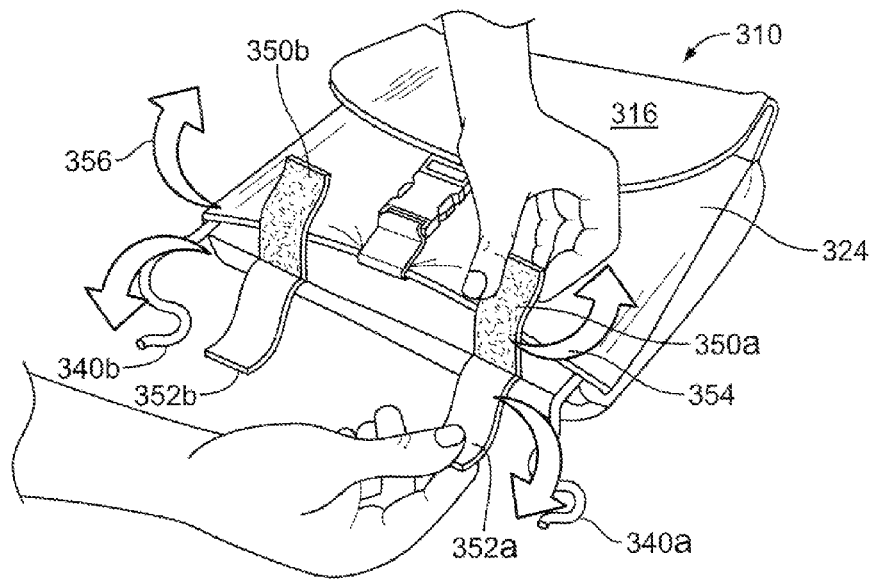
FIGS. 30A-30D are perspective views illustrating assembly of the collapsible bag of FIGS. 28A-29C to the wagon of FIGS. 28A-28D.
Figure 30B:
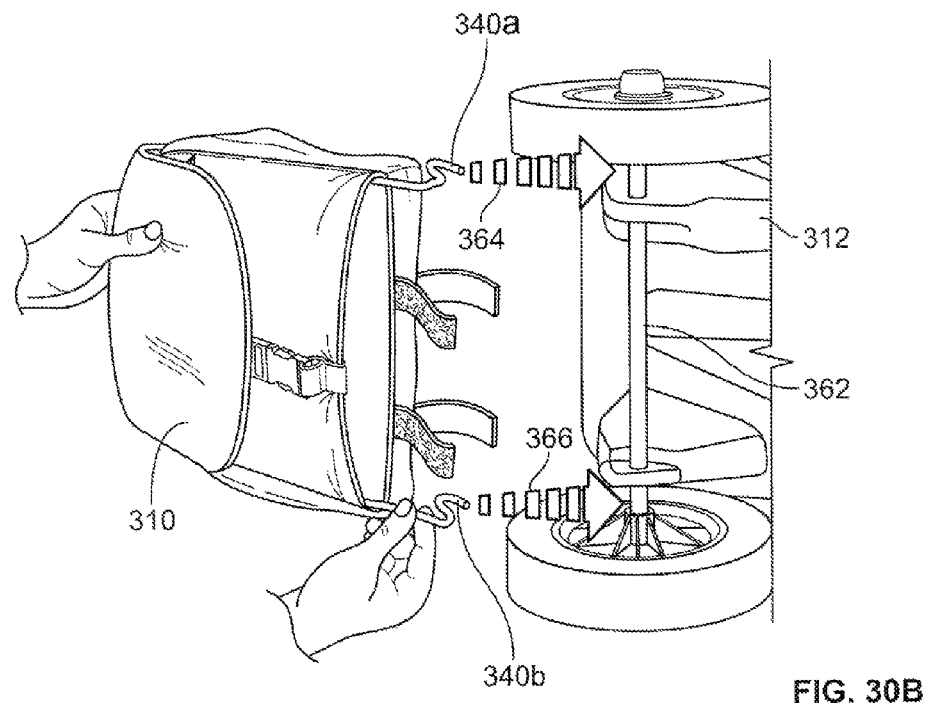
Figure 30C:
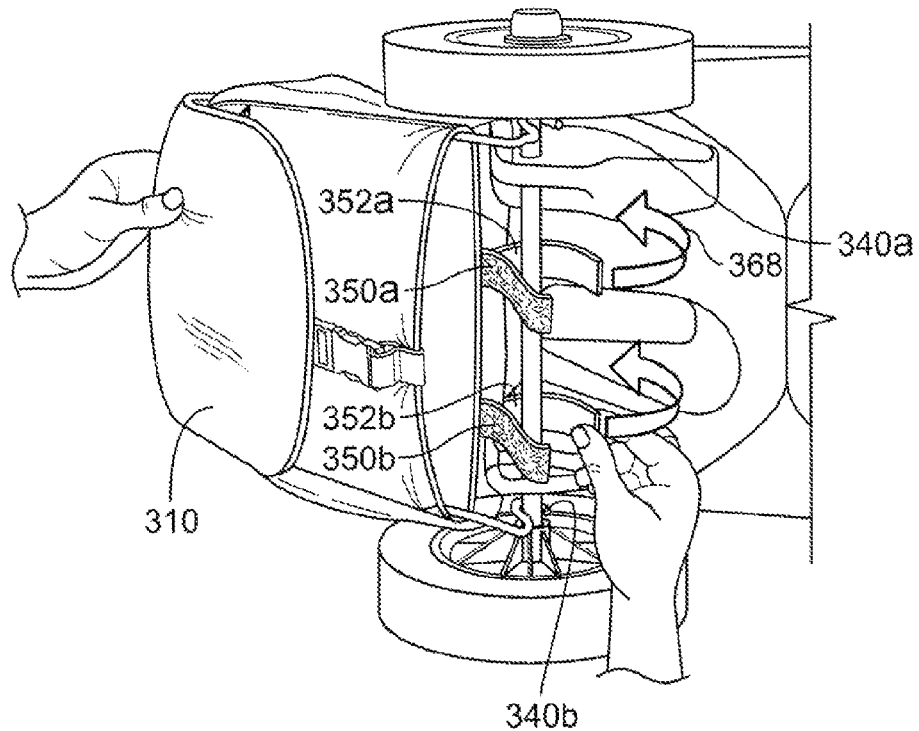
Figure 30D:
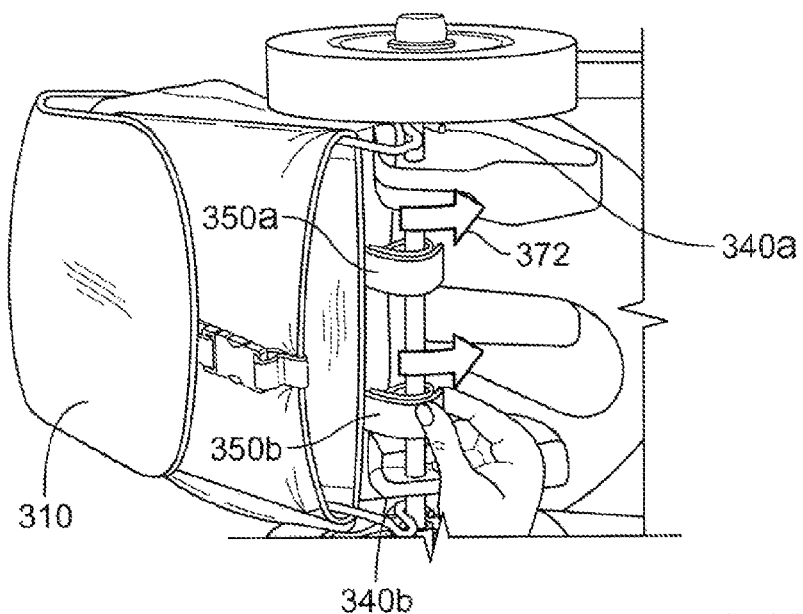

As illustrated by arrows 354 and 356 of FIG. 30A, the straps are first separated from one another. As illustrated in FIG. 30B, the C-shaped end portions 340a and 340b of the pivoting frame are next placed into engagement with rear axle 362 (as shown by arrows 364 and 366) of wagon 312. As illustrated by arrows 368 and 372 of FIGS. 30C and 30D, respectively, the straps 350a and 352a are fastened together around wagon rear axle 362. Straps 350b and 352b are also fastened together around the rear axle 362. As a result, the pivoting frame, and thus bottom 324 of the bag 310, is pivotally secured to the rear axle of the wagon.

Figure 31A:
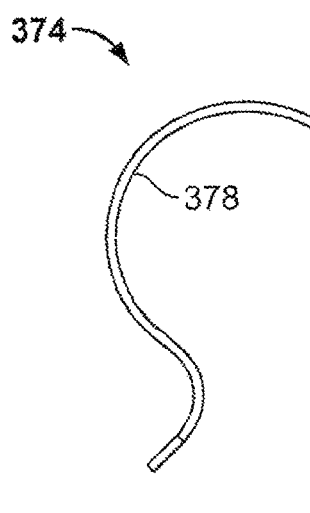
FIGS. 31A and 31B are side elevational and front elevational views of the top frame spring clip of the folding accessory bag of FIGS. 28A-30D.
Figure 31B:
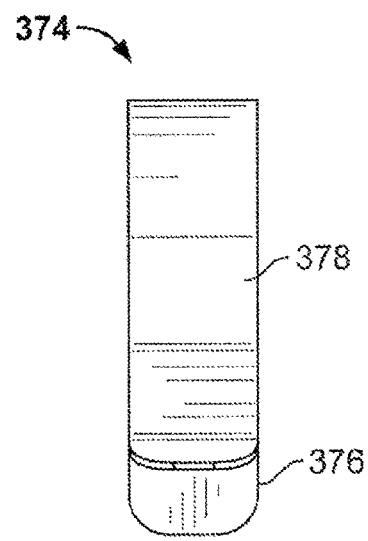
Figure 32A:
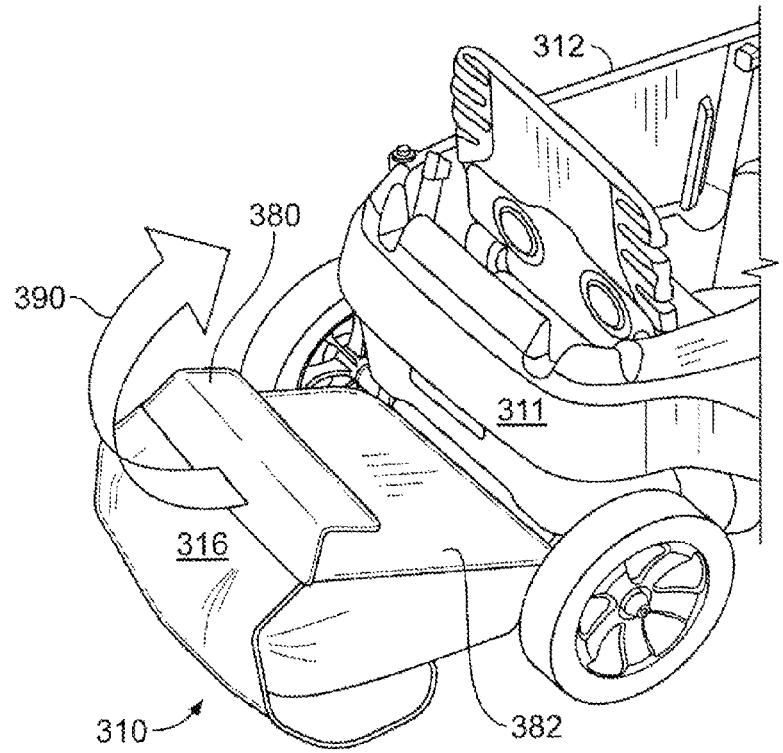
FIGS. 32A and 32B are perspective views illustrating assembly of the connector flap of the collapsible storage bag of FIGS. 28A-30D to the wagon of FIGS. 28A-28D and 30B-30D.
Figure 32B:
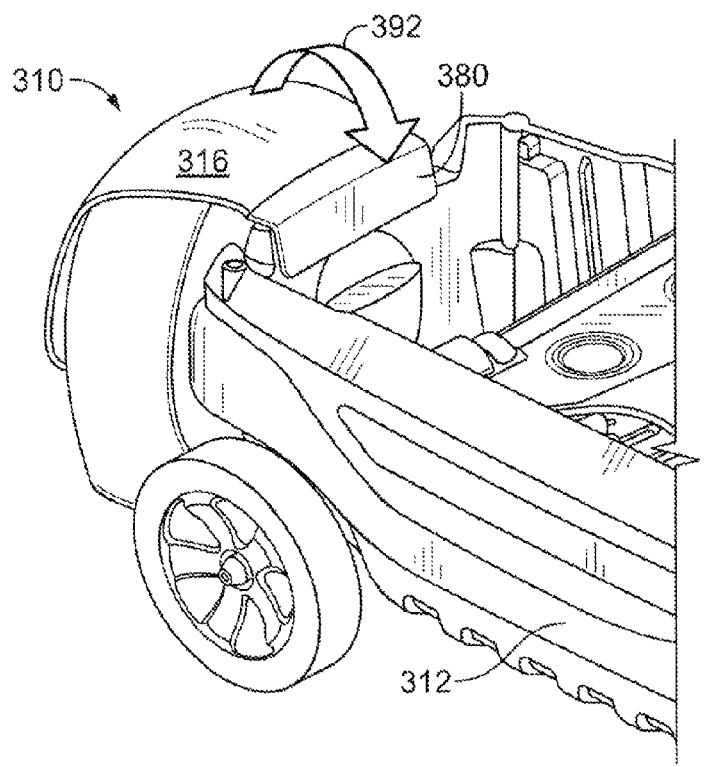

A top frame spring clip of the bag 310 of FIGS. 28A-30D is indicated in general at 374 in FIGS. 31A and 31B. As illustrated in FIG. 31A, the spring clip 374 includes a flat portion 376 and a curved portion 378 so that a general hook shape is formed. As illustrated in FIGS. 32A and 32B, the wagon bag 310 features a connector flap 380 within which the curved portions (378 in FIGS. 31A and 31B) of one or more top frame spring clips 374 are sewn. With reference to FIG. 32A, the flat portion 376 of the top frame spring clip is sewn into the back panel 382 of the bag. As illustrated by arrows 390 and 392 in FIGS. 32A and 32B, the flap 380, due to spring clip(s) 374, serves as a connector that engages and grips the top edge portion of the back wall 311 of the wagon 312 to secure the bag thereto.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A storage bag system for a wagon featuring a sidewall comprising:
   a) a collapsible storage bag adapted to be connected to the sidewall of the wagon and movable between an expanded configuration and a collapsed configuration;
   b) a connector for attaching the collapsible storage bag to the sidewall of the wagon; and
   c) a pivoting frame attached to the bottom of the collapsible storage bag and adapted to be pivotally attached to the wagon to pivot between a raised position, corresponding to the collapsed configuration of the collapsible storage bag, and a lowered position, corresponding to the expanded configuration of the collapsible storage bag, wherein the pivoting frame includes at least one sleeve adapted to engage a rear axle of the wagon in a pivoting fashion.

2. The storage bag system of claim 1 wherein the collapsible storage bag includes a back panel and a cover, said back panel of the collapsible storage bag being provided with the connector and said back panel and cover featuring bottom edges that are joined by a hinge and side and top edges that are provided with a zipper so that a remaining portion of the collapsible storage bag may be contained between the back panel and cover when the zipper is in a closed condition corresponding to the collapsible storage bag in the collapsed configuration and, when said zipper is in an open condition, said cover pivoting with respect to said back panel and the remaining portion of the collapsible storage bag expanded to place the collapsible storage bag in the expanded configuration.

3. The storage bag system of claim 2 wherein the connector includes a knob connector positioned on the back panel of the collapsible storage bag, said knob connector adapted to engage a corresponding slot connector positioned on the sidewall of the wagon.

4. The storage bag system of claim 1 further comprising a seat pad including a flap that wraps at least partially around the sidewall of the wagon.

5. The storage bag system of claim 4 wherein the seat pad includes an upper flap and a lower flap including a fastening arrangement whereby the upper and lower flaps may be secured together around the sidewall of the wagon.

6. The storage bag system of claim 1 wherein the collapsible storage bag further includes an upper portion and a lower portion, and wherein the lower portion includes a closure element that allows the lower portion of the accessory bag to expand into an expanded configuration and to retract into the collapsed configuration.

7. The storage bag system of claim 6 wherein the closure element includes a spiral zipper that wraps around the lower portion of the collapsible storage bag.

8. The storage bag system of claim 1 further comprising an accessory bag adapted to engage a second sidewall of the wagon, said accessory bag including at least one bottle holder.

9. The storage bag system of claim 8 wherein the accessory bag includes a pair of bottle holders with a central channel positioned therebetween, said central channel adapted to receive a handle of the wagon.

10. The storage bag system of claim 1 wherein said collapsible storage bag includes a lid, a rear wall and a bottom and the storage bag system further comprising;
d) a lid fastener attached to the lid of the collapsible storage bag;
e) a rear wall fastener attached to the rear wall of the collapsible storage bag;
f) a bottom fastener attached to the bottom of the collapsible storage bag;
g) said lid fastener adapted to engage the bottom fastener to secure the collapsible storage bag in the collapsed configuration and said lid fastener adapted to engage the rear wall fastener when the collapsible storage bag is in the expanded configuration.

11. The storage bag system of claim 10 wherein the collapsible storage bag also includes a connector flap containing a spring dip adapted to engage a top edge portion of the sidewall of the wagon.

12. The storage bag system of claim 10 wherein the lid fastener is an insertion buckle and the rear wall and bottom fasteners are receiving buckles.

13. The storage bag system of claim 10 wherein the pivoting frame is generally U-shaped.

14. The storage bag system of claim 10 wherein the pivoting frame includes at least one generally C-shaped end portion adapted to engage a rear axle of the wagon in a pivoting fashion.

15. The storage bag system of claim 10 wherein the bottom of the collapsible storage bag includes a pocket adapted to receive the pivoting frame.

16. The storage bag system of claim 10 wherein the pivoting frame includes a stop adapted to engage the wagon to limit pivoting of the pivoting frame when in the lowered position.

17. The storage bag system of claim 10 wherein the collapsible storage bag includes a flap and the connector for securing the collapsible storage bag to the sidewall of the wagon includes a hole formed in the flap and a fastener adapted to pass through the hole and engage the sidewall of the wagon.

18. A wagon comprising:
a) a body having a sidewall;
b) a plurality of wheels secured to the body;
c) a collapsible storage bag movable between an expanded configuration and a collapsed configuration; and
d) a connector attaching the collapsible storage bag to the sidewall of the wagon; and
e) a pivoting frame attached to the bottom of the collapsible storage bag and pivotally attached to the wagon to pivot between a raised position, corresponding to the collapsed configuration of the collapsible storage bag, and a lowered position, corresponding to the expanded configuration of the collapsible storage bag, wherein the pivoting frame includes at least one sleeve adapted to engage a rear axle of the wagon in a pivoting fashion.

19. The wagon of claim 18 wherein the collapsible storage bag includes a hack panel and a cover, said back panel of the collapsible storage bag and the sidewall of the wagon being provided with the connector and said back panel and cover featuring bottom edges that are joined by a hinge and side and top edges that are provided with a zipper so that a remaining portion of the collapsible storage bag may be contained between the back panel and cover when the zipper is in a closed condition corresponding to the collapsible storage bag in the collapsed configuration and, when said zipper is in an open condition, said cover pivoting with respect to said back panel and the remaining portion of the collapsible storage bag expanded to place the collapsible storage bag in the expanded configuration.

20. The wagon of claim 19 wherein the connector includes a knob connector and a slot connector positioned between the back panel of the collapsible storage bag and the sidewall of the wagon.

21. The wagon of claim 20 wherein the knob connector is attached to the back panel of the collapsible storage bag and the slot connector is connected to the sidewall of the wagon.

22. The wagon of claim 18 further comprising a seat pad including a flap wrapping at least partially around the sidewall of the wagon.

23. The wagon of claim 22 wherein the seat pad includes an upper flap and a lower flap including a fastening arrangement whereby the upper and lower flaps are secured together around the sidewall of the wagon.

24. The wagon of claim 18 wherein the collapsible storage bag further includes an upper portion and a lower portion, and wherein the lower portion includes a closure element that allows the lower portion of the accessory bag to expand into an expanded configuration and to retract into the collapsed configuration.

25. The wagon of claim 24 wherein the closure element includes a spiral zipper that wraps around the lower portion of the collapsible storage bag.

26. The wagon of claim 18 further comprising an accessory bag adapted to engage a second-sidewall of the wagon, said accessory bag including at least one bottle holder.

27. The wagon of claim 26 wherein the accessory bag includes a pair of bottle holders with a central channel positioned therebetween, said central channel adapted to receive a handle of the wagon.

28. The wagon of claim 18 wherein said collapsible storage bag includes a lid, a rear wall and a bottom and the storage bag system further comprising:
f) a lid listener attached to the lid of the collapsible storage bag;
g) a rear wall fastener attached to the rear wall of the collapsible storage bag;

h) a bottom fastener attached to the bottom of the collapsible storage bag;
i) said lid fastener adapted to engage the bottom fastener to secure the collapsible storage bag in the collapsed configuration and said lid fastener adapted to engage the rear wall fastener when the collapsible storage bag is in the expanded configuration.

29. The wagon of claim 28 wherein the collapsible storage bag also includes a connector flap containing a spring clip engaging a top edge portion of the sidewall of the wagon.

30. The wagon of claim 28 wherein the lid fastener is an insertion buckle and the rear wall and bottom fasteners are receiving buckles.

31. The wagon of claim 28 wherein the pivoting frame is generally U-shaped.

32. The wagon of claim 28 further comprising a rear axle and wherein the pivoting frame includes at least one generally C-shaped end portion adapted to engage the rear axle of the wagon in a pivoting fashion.

33. The wagon of claim 28 wherein the bottom of the collapsible storage bag includes a pocket adapted to receive the pivoting frame.

34. The wagon of claim 28 wherein the pivoting frame includes a stop adapted to engage the wagon to limit pivoting of the pivoting frame when in the lowered position.

35. The wagon of claim 28 wherein the collapsible storage bag includes a flap and the connector for securing the collapsible storage bag to the sidewall of the wagon includes a hole formed in the flap and a fastener passing through the hole and engaging the sidewall of the wagon.

36. The wagon of claim 18 wherein the wagon includes a rear sidewall and the collapsible storage bag is attached to the rear sidewall.

37. A storage system for a wagon having a rear axle comprising:
a) a storage container having an opening, an interior and a panel defining a wall of said interior;
b) said panel adapted to be pivotally attached to the rear axle of the wagon so as to move between raised and lower positions, where said interior may be accessed through the opening when the panel is in the lowered position.

38. The storage system of claim 37 wherein the opening is positioned adjacent to the panel.

39. The storage system of claim 37 wherein the wagon includes a rear sidewall and the panel pivots towards the rear sidewall as the panel moves to the raised position.

40. The storage system of claim 37 wherein the panel includes a fastener to secure the panel in the raised position.

41. The storage system of claim 37 further comprising a stop adapted to engage the wagon to limit pivoting of the panel when in the lowered position.

42. A wagon comprising:
a) a body;
b) a pair of rear wheels secured to the body by a rear axle;
c) a storage container having an opening, an interior and a panel defining a wall of said interior;
d) said panel pivotally attached to the rear axle so as to move between raised and lowered positions, where said interior may be accessed through the opening when the panel is in the lowered position.

43. The wagon of claim 42 wherein the opening is positioned adjacent to the panel.

44. The wagon of claim 42 wherein the body includes a rear sidewall and the panel pivots towards the rear sidewall as the panel moves to the raised position.

45. The wagon of claim 42 wherein the panel includes a fastener to secure the panel in the raised position.

46. The wagon of claim 42 further comprising a stop adapted to engage the wagon to limit pivoting of the panel when in the lowered position.

* * * * *